United States Patent
Sakamoto

(10) Patent No.: US 6,807,139 B2
(45) Date of Patent: Oct. 19, 2004

(54) OBJECTIVE LENS AND OPTICAL PICKUP APPARATUS

(75) Inventor: Katsuya Sakamoto, Hachioji (JP)

(73) Assignee: Konica Corporation, Tokyo (JP)

( * ) Notice: Subject to any disclaimer, the term of this patent is extended or adjusted under 35 U.S.C. 154(b) by 372 days.

(21) Appl. No.: 10/117,188

(22) Filed: Apr. 8, 2002

(65) Prior Publication Data

US 2003/0058776 A1 Mar. 27, 2003

(30) Foreign Application Priority Data

Apr. 12, 2001 (JP) ........................................ 2001-113825

(51) Int. Cl.$^7$ ................................................ G11B 7/00
(52) U.S. Cl. ................................................ 369/112.07
(58) Field of Search ...................... 369/112.08, 112.23, 369/112.24, 112.25, 112.26, 112.05, 112.07, 94, 44.23; 359/719, 742, 743, 565, 566, 569

(56) References Cited

U.S. PATENT DOCUMENTS

| | | | | |
|---|---|---|---|---|
| 5,844,879 A | * | 12/1998 | Morita et al. ............ | 369/44.23 |
| 6,088,322 A | * | 7/2000 | Broome et al. ......... | 369/112.26 |
| 6,192,021 B1 | * | 2/2001 | Saito et al. ............ | 369/112.26 |
| 6,344,935 B1 | * | 2/2002 | Maruyama .............. | 369/112.26 |
| 6,366,542 B1 | * | 4/2002 | Kojima et al. ........... | 369/44.23 |
| 6,449,095 B1 | * | 9/2002 | Ohtaki et al. ................ | 369/103 |
| 6,515,955 B2 | * | 2/2003 | Takeuchi ............... | 369/112.08 |
| 6,556,534 B2 | * | 4/2003 | Shimozono ............ | 369/112.26 |
| 6,594,222 B2 | * | 7/2003 | Maruyama .............. | 369/112.26 |
| 6,667,943 B1 | * | 12/2003 | Maruyama et al. ..... | 369/112.08 |
| 6,674,059 B1 | * | 1/2004 | Nakano ................... | 369/44.12 |
| 6,687,037 B2 | * | 2/2004 | Hendriks et al. ....... | 369/112.13 |
| 6,741,539 B2 | * | 5/2004 | Maruyama .............. | 369/112.08 |

* cited by examiner

Primary Examiner—Thang V. Tran
(74) Attorney, Agent, or Firm—Finnegan, Henderson, Farabow, Garrett & Dunner, L.L.P.

(57) ABSTRACT

An objective lens comprises at least inner and outer optically functional regions arranged in a direction perpendicular to an optical axis and each of the inner and outer optically functional regions has a diffractive structure. The objective lens comprises a light amount reducing structure to reduce an amount of the light flux passing through a region of the objective lens other than the inner optically functional region when recording or reproducing is conducted for CD.

32 Claims, 16 Drawing Sheets

OUTER OPTICAL FUNCTIONAL AREA

INTERMEDIATE OPTICAL FUNCTIONAL AREA

INNER OPTICAL FUNCTIONAL AREA

DISCONTINUOUS

FIRST-ORDER DIFFERENTIAL IS DISCONTINUOUS

DISCONTINUOUS FOR A CERTAIN WAVELENGTH

EXAMPLE 1

SIMULATION OF DEFOCUS SIGNAL ON CD SIDE ($\lambda$ =785 nm)

WHEN SECOND ORDER IS USED FOR DIFFRACTION ORDER NUMBER
OF OUTER OPTICAL FUNCTIONAL AREA IN DESIGNING $\Delta f_B$ ($\mu$m)

WHEN FIRST ORDER IS USED FOR DIFFRACTION ORDER NUMBER
OF OUTER OPTICAL FUNCTIONAL AREA IN DESIGNING $\Delta f_B$ ($\mu$m)

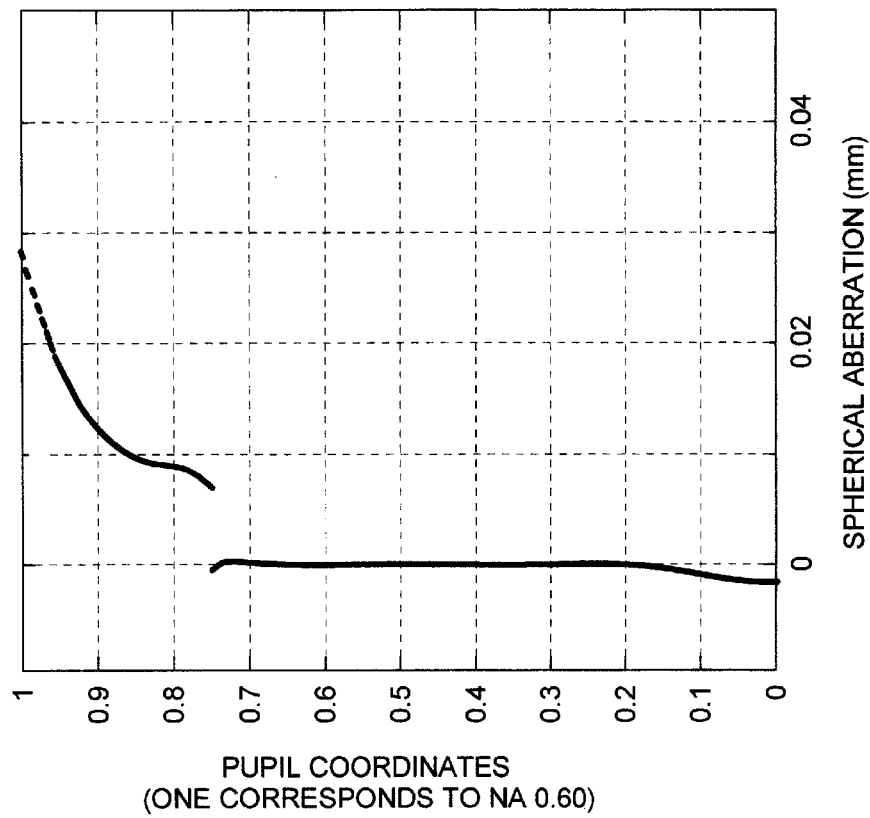
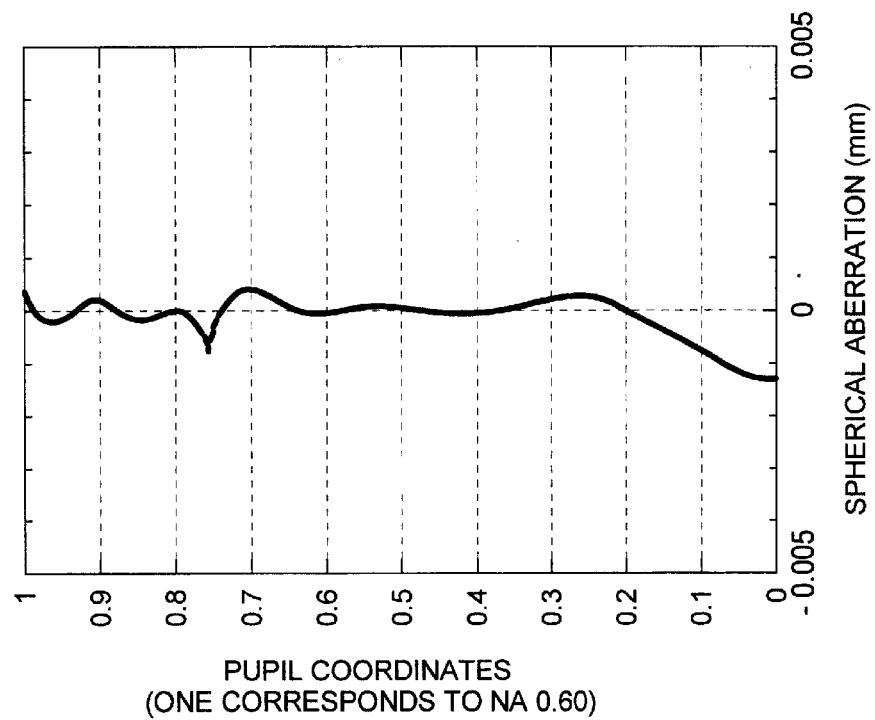
FIG. 9  EXAMPLE 2  DRAWING OF SPHERICAL ABERRATION

EXAMPLE 2

SIMULATION OF DEFOCUS SIGNAL ON CD SIDE ($\lambda$ =785 nm)
WHEN 525 nm IS USED FOR DESIGNING WAVELENGTH
FOR OUTER OPTICAL FUNCTIONAL AREA $\Delta f_B$ ($\mu$m)

WHEN DVD WAVELENGTH ($\lambda$ =655 nm) IS USED FOR DESIGNING
WAVELENGTH FOR OUTER OPTICAL FUNCTIONAL AREA $\Delta f_B$ ($\mu$m)

FIG. 11
EXAMPLE 3 DRAWING OF SPHERICAL ABERRATION
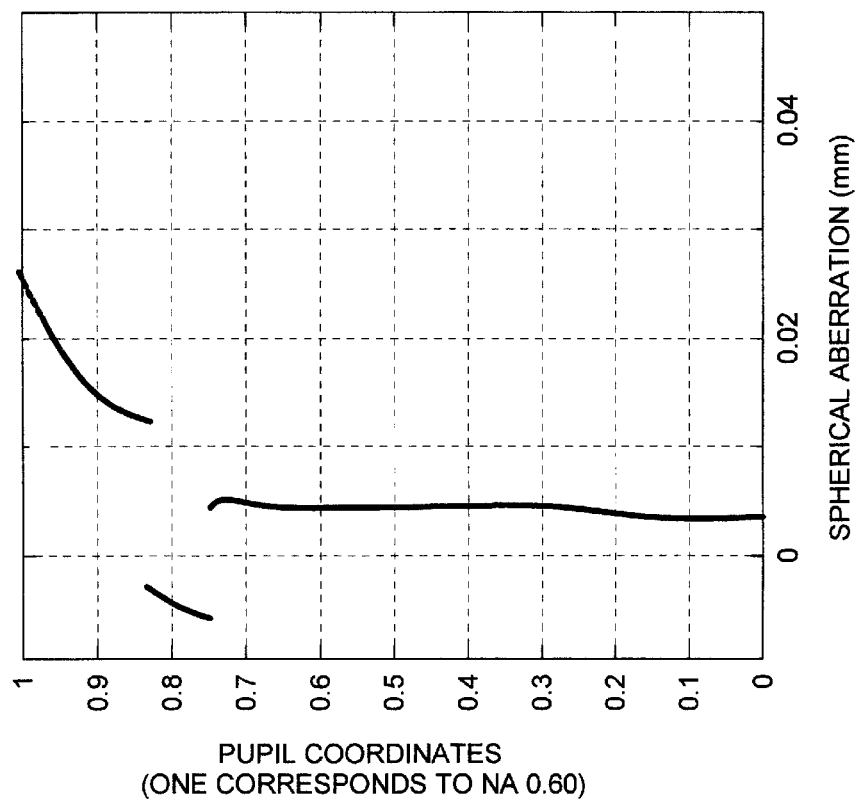
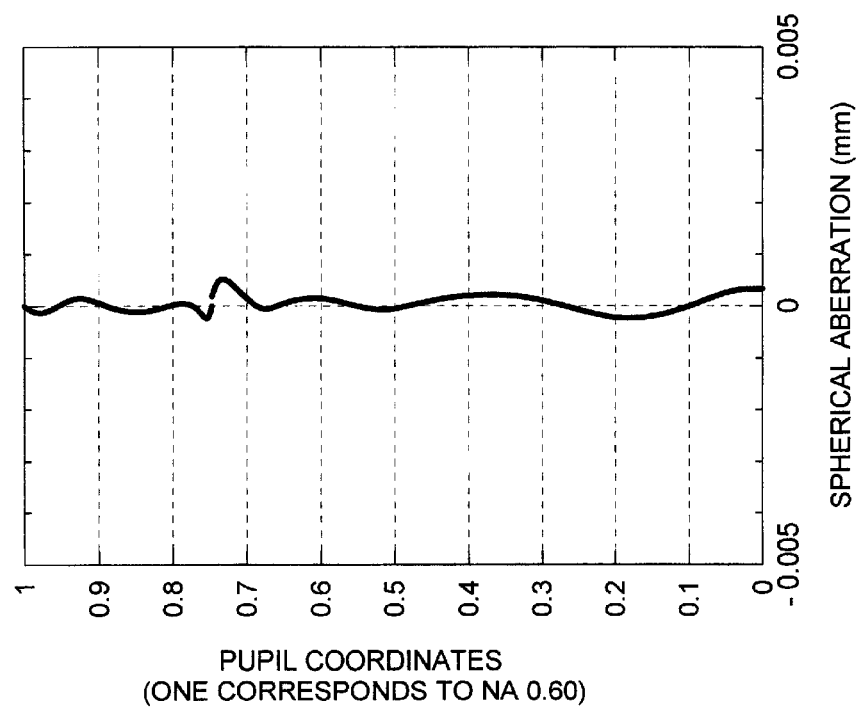

FIG. 12 (a)

EXAMPLE 3

SIMULATION OF DEFOCUS SIGNAL ON CD SIDE ($\lambda = 785$ nm)

WHEN INTERMEDIATE OPTICAL FUNCTIONAL AREA IS COMPOSED OF DIFFRACTIVE SURFACE DIFFERENT FROM THAT OF OUTER OPTICAL FUNCTIONAL AREA

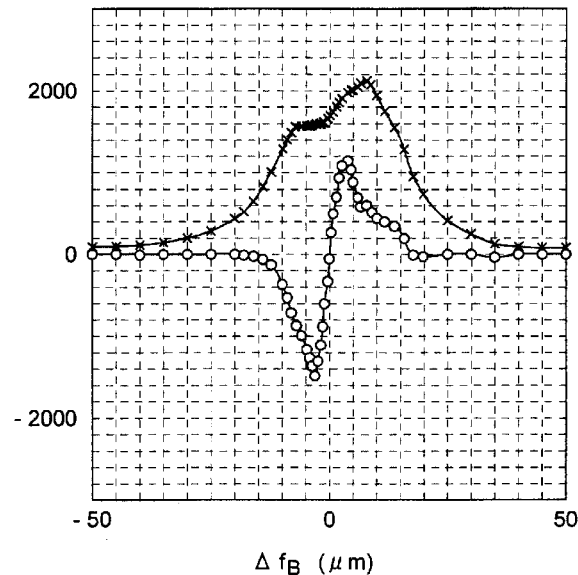

$\Delta f_B$ ($\mu$m)

FIG. 12 (b)

WHEN INTERMEDIATE OPTICAL FUNCTIONAL AREA IS COMPOSED OF DIFFRACTIVE SURFACE SAME AS THAT OF OUTER OPTICAL FUNCTIONAL AREA

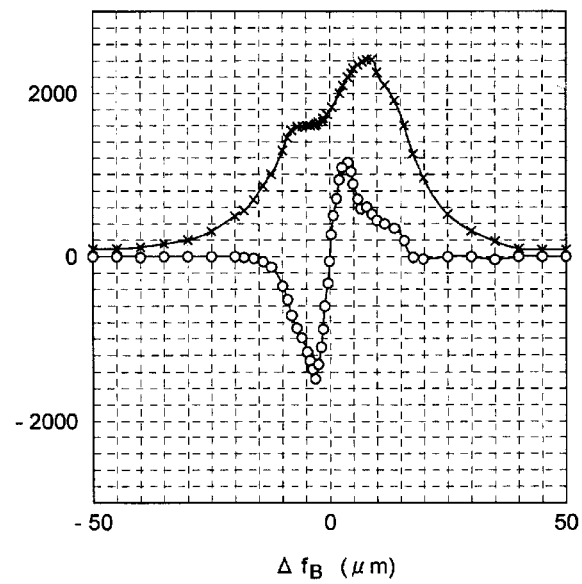

$\Delta f_B$ ($\mu$m)

EXAMPLE 3

SPOT PROFILE ON OPTICAL INFORMATION RECORDING SURFACE
WHEN CD IS IN BEST DEFOCUS

WHEN INTERMEDIATE OPTICAL FUNCTIONAL AREA IS COMPOSED
OF DIFFRACTIVE SURFACE SAME AS THAT OF OUTER
OPTICAL FUNCTIONAL AREA

EXAMPLE 3

SPOT PROFILE ON OPTICAL INFORMATION RECORDING
SURFACE WHEN CD IS IN BEST DEFOCUS

WHEN INTERMEDIATE OPTICAL FUNCTIONAL AREA IS COMPOSED
OF DIFFRACTIVE SURFACE DIFFERENT FROM THAT OF OUTER
OPTICAL FUNCTIONAL AREA

OBJECTIVE LENS AND OPTICAL PICKUP APPARATUS

BACKGROUND OF THE INVENTION

The present invention relates to an objective lens used for an optical pickup apparatus, an optical pickup apparatus (device) and information recording and reproducing method, and in particular, to an objective lens wherein a single objective lens performs recording/reproduction for optical information recording media having various recording density, an optical pickup device and an information recording and reproducing method, and further relates to an objective lens, an optical pickup device, and an information recording and reproducing method, the objective lens is provided with a diffractive structure and is used within a finite magnification (a magnification for a finite light source), the optical information recording medium having a high recording density satisfies the excellent temperature characteristic, and it is possible to reduce the noise signal generated when the focusing movement is performed for an optical information recording medium having low recording density.

At the present time, there are many kinds of the optical information recording media, whose standards are determined as shown in Table 1. Incidentally, hereinafter (including lens data of tables), E (for example, 2.5×E-3) shows powers of 10 (for example, $2.5 \times 10^{-3}$).

TABLE 1

| Optical disk | Thickness (mm) of transparent base board | Necessary numerical aperture NA (wave length of light source λ nm) |
|---|---|---|
| CD, CD-R (reproduction) | 1.20 | 0.45 (λ = 780 nm) |
| CD-R (recording, reproduction) | 1.20 | 0.50 (λ = 780 nm) |
| DVD | 0.60 | 0.60 (λ = 635 nm) |

As an example wherein there is required an interchangeability among optical information recording media having various recording densities, there are DVD and CD. As shown in Table 1, optical information recording media are different each other in terms of thickness of transparent base board. In order to obtain the interchangeability, it is necessary to correct spherical aberration which is caused by the difference of the transparent base board thickness, by using some means. Further, since there is a difference between the required numerical apertures for DVD and CD, it is necessary to take some measures to meet the situation.

As an example of the objective lens which obtains the interchangeability between DVD and CD, there is developed the objective lens having a diffractive structure. As such an objective lens, for example, there is an objective lens wherein, there are provided different diffractive structures for inner and outer areas on either one of the lens surfaces which are separated at specific distance h from an optical axis, and the inner area corrects the spherical aberration for each of the thickness of the transparent base boards, while the outer area corrects the spherical aberration for DVD only and makes flare without making correction of the spherical aberration for CD. By the above-mentioned construction of the objective lens, it is possible to form a light converged spot required for recording or reproduction of information on each of the optical information recording media.

By the way, for the flare formation for CD on the outer area, it is conceivable to form an over flare and an under flare. When the under flare is taken, the design turns out to be of a strong effect of diffraction, and a diffraction pitch has a tendency to be narrow. Accordingly, it is preferable for the design to take the over flare, from the view point of diffraction efficiency.

On the other hand, for the objective lens of the recent optical pickup device which performs information recording or reproduction for DVD, infinite magnifications are employed widely, and thereby, a collimator lens is usually necessary for radiating a parallel light flux to the objective lens. However, from the viewpoint of the structure, a finite magnification structure without the collimator lens has the advantage of designing an optical system of the optical pickup device to be simple. Incidentally, from the viewpoint of the optics, due to the shift from the infinite magnification to the finite magnification, there are problems that the shift to a tracking direction of the objective lens generates coma, and that the deterioration becomes greater in the spherical aberration generated by the change of temperature.

Using an image side numerical aperture NA of the objective lens, focal length f, image forming magnification m and wavelength λ of laser light source, the three order changed amount of the aberration caused by temperature change is shown by the following formula, $$\delta SA_3/\delta T \propto f \cdot (1-m)^4 \cdot NA^4 / \lambda \quad (1)$$

and it can be understood that the change of the temperature characteristic becomes excessive with more finite magnification, shorter wavelength and higher numerical aperture in the optical pickup device.

Especially when the objective lens is structured by plastic, it is regarded as questionable that the spherical aberration deteriorates due to change of refractive index caused by the change of temperature. In FIG. 16, when temperature changes from 25° C. to 55° C., there is shown the changed amount of spherical aberration of the plastic objective lens which is corrected for aberration in m=−1/7.2, NA=0.60, and λ=650 nm under the standard temperature 25° C. (the change of refractive index to the change of material temperature dn/dT=−0.00012 (/° C.)).

The formation of diffractive structure on the objective lens can reduce spherical aberration caused by the change of temperature, though the objective lens is made of plastic. The reason for this is as follows. That is, power of the diffractive structure has character to be proportional to the wavelength, for example, when temperature rises, refractive index of plastic drops to generate the over spherical aberration, while on the diffractive section, a laser oscillated wavelength is shifted to the longer wavelength side to generate the under spherical aberration, which means that both of them have the effect to cancel spherical aberration each other.

However, the correction of the temperature characteristic by diffraction has following problems on the plastic objective lens having large percentage of the finite magnification.

As understood from FIG. 15, when an over spherical aberration is highly generated at a refractive section of the objective lens, it is impossible to cancel the spherical aberration by the objective lens only, unless an under spherical aberration is generated highly at the diffractive section. Since above-mentioned matter is the same meaning as the matter that the change of refractive index corresponding to the change of temperature (this is wavelength dependence) is made to be high at the diffractive section, the effect of diffraction becomes higher. Then, an over flare section for CD changes to the under direction at the outer area, and as a result, the flare section nears the optical axis.

It means on CD that a distance between a light converged spot formed by the light flux passing through the inner area and an inside diameter of flare formed by light flux passing through the outer area becomes shorter. The nearer the inside diameter approaches the converged spot, the more flare light which may be detected by an optical detector increases, which is not desirable, because of increment of noise signals in focusing. That is, if the effect of diffraction is made to be higher for the purpose of improving the temperature characteristic, the focusing noise is worsened, which is a problem.

SUMMARY OF THE INVENTION

The invention has been achieved in view of the above-mentioned problems, and the object of the invention is to provide the objective lens for the optical pickup device which can perform the recording or reproduction of information properly though having simple construction, for the various types of optical information recording media, the optical pickup device and information recording and reproducing method.

The objective lens mentioned in (1) is one which is used for the optical pickup device provided with a first light source, a second light source, a converging optical system, and an optical detector;

the first light source having wavelength $\lambda_1$ emits the light flux to a first optical information recording medium having thickness $t_1$ of its transparent base board, to record or reproduce information;

the second light source having wavelength $\lambda_2$ ($\lambda_1 < \lambda_2$) emits the light flux to a second optical information recording medium having thickness $t_2$ ($t_1 < t_2$) of its transparent base board, to record or reproduce information;

the converging optical system has the objective lens which converges the light fluxes emitted from the first and second light sources on the information recording surfaces through the transparent base boards of the first and second information recording media;

the objective lens is used within the finite magnification m ($-0.33 < m < -0.10$), and is provided with two or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closer to the optical axis among the above-mentioned optical functional areas;

for the light flux passing through the outer optical functional area, the spherical aberration generated during recording or reproduction for the first optical information recording media is corrected by the diffractive structure of the outer optical functional area that is farther from the optical axis among the above-mentioned optical functional areas, and the light flux is flared when recording or reproduction of information is performed for the second optical information recording media;

in the outer optical functional area, when compared with the transmittance of wavelength $\lambda_1$, the transmittance of wavelength $\lambda_2$ is so lower that flare part of the light flux used for the recording or reproduction of information for the second optical information recording medium is shifted to the under direction, that is, the wavelength dependence of the diffractive structure is made to be higher, and consequently, even when the flare part nears the optical axis, the transmittance of the light flux having wavelength $\lambda_2$ is lower than that of the light flux having wavelength $\lambda_1$, and thereby, the detector which detects the reflected light from the second optical information recording media hardly detects, which suppresses possibility of erroneous detection.

The objective lens mentioned in (2) is one which is used for the optical pickup device provided with a first light source, a second light source, a converging optical system, and an optical detector;

the first light source having wavelength $\lambda_1$ emits the light flux to a first optical information recording medium having the thickness $t_1$ of its transparent base board, to record or regenerate information;

the second light source having wavelength $\lambda_2$ ($\lambda_1 < \lambda_2$) emits the light flux to a second optical information recording medium having the thickness $t_2$ ($t_1 < t_2$) of its transparent base board, to record or regenerate information;

the converging optical system has the objective lens which converges the light flux emitted from the first and second light sources on the information recording surfaces through the transparent base boards of the first and second information recording media;

the objective lens is used within the finite magnification m ($-0.33 < m < -0.10$), and is provided with three or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closing to the optical axis among the above-mentioned optical functional areas;

for the light flux passing through the outer optical functional area, the spherical aberration generated during recording or reproduction for the first optical information recording media is corrected by the diffractive structure of the outer optical functional area that is farther from the optical axis among the above-mentioned optical functional areas, and the light flux is flared when recording or reproduction of information is performed for the second optical information recording media;

there is provided a light amount reducing means, which reduces the light amount entering the optical detector, in an optical path between the light source and the optical detector, when recording or reproduction of information is performed at least for the second optical information recording medium, the light amount reducing means reduces the amount of light flux entering the optical detector through an intermediate optical functional area which is between the inner optical functional area and the outer optical functional area, when the focusing of the objective lens is performed, the wavelength dependence of the diffractive structure is made to be higher, flare part of the light flux used for the recording or reproduction of information for the second optical information recording media is shifted to the under direction, and consequently, even when the flare part nears the optical axis, the light amount reducing means can reduce the amount of light flux entering the optical detector through the intermediate optical functional area, at least when the objective lens focuses, and thereby, the detector which detects the reflected light from the second optical information recording media hardly detects, which suppresses possibility of erroneous detection.

In the objective lens for the optical pickup device mentioned in (3), the light amount reducing means is a refracting interface or a diffractive structure which is provided on the intermediate optical functional area. Concerning the light flux passing through the intermediate optical functional area, the light flux is flared at least when recording or reproduction of information is performed for the second optical information recording medium, accordingly, it is possible to record or reproduce information for a plurality of the optical information recording media having various thicknesses of the transparent base boards.

In the objective lens for the optical pickup device mentioned in (4), the light amount reducing means is a diffractive structure which is provided on the intermediate optical functional area. Concerning the light flux passing through the intermediate optical functional area, the light flux has an under spherical aberration at least when recording or reproduction of information is performed for the second optical information recording medium, accordingly, it is possible to record or reproduce information for a plurality of the optical information recording media having various thicknesses of the transparent base boards.

In the objective lens for the optical pickup device mentioned in (5), when recording or reproduction of information is performed for the first optical information recording media, spherical aberration concerning the light flux passing through the intermediate optical functional area is corrected by the light amount reducing means, accordingly, it is possible to record or reproduce information for a plurality of the optical information recording media having various thicknesses of the transparent base boards.

In the objective lens for the optical pickup device mentioned in (6), if the light amount reducing means is a dichroic filter, it is possible to record or reproduce information for a plurality of the optical information recording media having various thicknesses of the transparent base boards, without largely changing the structure of the existing optical pickup device.

In the objective lens for the optical pickup device mentioned in (7), if the light amount reducing means is a liquid crystal shutter, the light amount can be reduced arbitrarily, accordingly, it is possible to record or reproduce information for a plurality of the optical information recording media having various thicknesses of the transparent base boards.

In the objective lens for the optical pickup device mentioned in (8), when recording or reproduction of information is performed for the second optical information recording media, diffractive order number $n_{out}$ of the diffracted light with the highest intensity generated at the diffractive structure of the outer optical functional area and diffractive order number $n_{in}$ of the diffracted light with the highest intensity generated at the diffractive structure of the inner optical functional area satisfy the following formula, $$|n_{out}| \geq |n_{in}| \tag{2}$$

and thereby, the flare light amount is reduced by the reduction of the efficiency of the diffracted light generated by the diffractive structure at the outer optical functional area, which can perform the recording or reproduction of information for a plurality of optical information recording media having various thicknesses of the transparent base boards.

In the objective lens for the optical pickup device mentioned in (9), when a design base wavelength of the diffractive structure in the outer optical functional area is represented by $\lambda_B$, then the formula $0.5\ \lambda_1 < \lambda_B < 1.1\ \lambda_1$ holds. Accordingly, the establishment of design base wavelength $\lambda_B$ to be smaller than the upper limit can control the transmittance of the second optical information recording medium, while the establishment of design base wavelength $\lambda_B$ to be greater than the lower limit can keep the transmittance of the first optical information recording media to be high.

The objective lens mentioned in (10) is one which is used for the optical pickup device provided with a first light source, a second light source, a converging optical system, and an optical detector;

the first light source having wavelength $\lambda_1$ emits the light flux to a first optical information recording medium having thickness $t_1$ of its transparent base board, to record or regenerate information;

the second light source having wavelength $\lambda_2$ ($\lambda_1 < \lambda_2$) emits the light flux to a second optical information recording medium having thickness $t_2$ ($t_1 < t_2$) of its transparent base board, to record or regenerate information;

the converging optical system has the objective lens which converges the light flux emitted from the first and second light sources on the information recording surfaces through the transparent base boards of the first and second information recording media;

the objective lens is provided with two or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closer to the optical axis among the above-mentioned optical functional areas;

for the light flux passing through the outer optical functional area, the spherical aberration generated during recording or reproduction for the first optical information recording media is corrected by the diffractive structure of the outer optical functional area that is farther from the optical axis among the above-mentioned optical functional areas;

the transmittance of the objective lens for the light flux having wavelength $\lambda_2$ passing through the outer optical functional area is not more than 50%, and thereby, the flare part of the light flux used for the recording or reproduction of information for the second optical information recording medium is shifted to the under direction, that is, the wavelength dependence of the diffractive structure is made to be higher, and consequently, even when the flare part nears the optical axis, the transmittance of the objective lens for the light flux having wavelength $\lambda_2$ passing through the outer optical functional area is not more than 50%, and thereby, the detector which detects the reflected light from the second optical information recording media hardly detects, which suppresses possibility of erroneous detection.

In the objective lens for the optical pickup device mentioned in (11), if the transmittances of the objective lens for the light flux having wavelength $\lambda_1$ and for the light flux having wavelength $\lambda_2$, passing through the inner optical functional area, are not less than 90%, it is possible to increase intensity of the light flux for the recording or the reproduction for the first optical information recording medium, which is preferable. Incidentally, for the establishment of the transmittance in (9) and (10), it is conceivable to cover at least one surface of the objective lens with coating film that can select the wavelength, to which, the invention is not limited.

In the objective lens for the optical pickup device mentioned in (12), magnification m1 of the objective lens for recording or reproduction of information for the first optical information recording medium is shown by the following formula, $$-1/2.5 \geq m1 \geq -1/10 \qquad (3)$$

where, if magnification m1 is equal to or greater than the lower limit, image height characteristic becomes good, and if it is not more than the upper limit, working distance of the objective lens can be secured, which is preferable. Further, if necessary numerical aperture NA 1 of the first optical information recording medium side is expressed by the following formula, $$0.65 \geq NA1 \geq 0.55 \qquad (4)$$

it is possible to provide the objective lens which is suitable for the recording or the reproduction of information having high density such as DVD.

In the objective lens for the optical pickup device mentioned in (13), magnification m2 of the objective lens for recording or reproduction of information for the second optical information recording media is shown by a formula, $$-1/2.5 \geq m2 \geq -1/10 \qquad (5)$$

where, if magnification m2 is equal to or greater than the lower limit, image height characteristic becomes good, and if it is not more than the upper limit, working distance of the objective lens can be secured, which is preferable. Further, if a necessary numerical aperture NA 2 of the second optical information recording media side is expressed by the following formula, $$0.57 \geq NA2 \geq -0.43 \qquad (6)$$

it is possible to provide the objective lens which is suitable for the recording or the reproduction of information having lower density such as CD use, compared with DVD use.

In the objective lens for the optical pickup device mentioned in (14), if the objective lens is made of plastic materials, the mass-production can be done with low cost, which is preferable.

The optical pickup device mentioned in (15) is provided with a first light source, a second light source, a converging optical system, and an optical detector;

the first light source having wavelength $\lambda_1$ emits the light flux to a first optical information recording medium having thickness ti of its transparent base board, to record or reproduce information.

the second light source having wavelength $\lambda_2$ ($\lambda_1 < \lambda_2$) emits the light flux to a second optical information recording medium having thickness $t_2$ ($t_1 < t_2$) of its transparent base board, to record or reproduce information;

the converging optical system has the objective lens which converges the light fluxes emitted from the first and second light sources on the information recording surfaces through the transparent base boards of the first and second information recording media;

the objective lens is used within the finite magnification m ($-0.33 < m < -0.10$), and is provided with two or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closer to the optical axis among the above-mentioned optical functional areas;

for the light flux passing through the outer optical functional area, the spherical aberration generated during recording or reproduction for the first optical information recording media is corrected by the diffractive structure of the outer optical functional area that is farther from the optical axis among the above-mentioned optical functional areas, and the light flux is flared when recording or reproduction of information is performed for the second optical information recording media;

in the outer optical functional area, when compared with the transmittance of wavelength $\lambda_1$, the transmittance of wavelength $\lambda_2$ is so lower that flare part of the light flux used for the recording or reproduction of information for the second optical information recording medium is shifted to the under direction, that is, the wavelength dependence of the diffractive structure is made to be higher, and consequently, even when the flare part nears the optical axis, the transmittance of the light flux having wavelength $\lambda_2$ is lower than that of the light flux having wavelength $\lambda_1$. Action and effect of the invention mentioned in (15) are the same as those of the invention mentioned in (1).

The optical pickup device mentioned in (16) is provided with a first light source, a second light source, a converging optical system, and an optical detector;

the first light source having wavelength $\lambda_1$ emits the light flux to a first optical information recording medium having the thickness $t_1$ of its transparent base board, to record or regenerate information;

the second light source having wavelength $\lambda_2$ ($\lambda_1 < \lambda_2$) emits the light flux to a second optical information recording medium having the thickness $t_2$ ($t_1 < t_2$) of its transparent base board, to record or regenerate information;

the converging optical system has the objective lens which converges the light flux emitted from the first and second light sources on the information recording surfaces through the transparent base boards of the first and second information recording media;

the objective lens is used within the finite magnification m ($-0.33 < m < -0.10$), and is provided with three or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closing to the optical axis among the above-mentioned optical functional areas;

for the light flux passing through the outer optical functional area, the spherical aberration generated during recording or reproduction for the first optical information recording media is corrected by the diffractive structure of the outer optical functional area that is farther from the optical axis among the above-mentioned optical functional areas, and the light flux is flared when recording or reproduction of information is performed for the second optical information recording media;

in an optical path between the light source and the optical detector, there is provided a light amount reducing means which reduces the light amount entering the optical detector;

when recording or reproduction of information is performed at least for the second optical information recording medium, the light amount reducing means reduces the amount of light flux entering the optical detector through an intermediate optical functional area which is between the inner optical functional area and the outer optical functional area, when the focusing of the objective lens is performed;

that is, the wavelength dependence of the diffractive structure is made to be higher, flare part of the light flux used for the recording or reproduction of information for the second optical information recording media is shifted to the under direction, and consequently, even when the flare part nears the optical axis, the light amount reducing means can reduce the amount of light flux entering the optical detector through the intermediate optical functional area, at least when the objective lens focuses. Action and effect of the invention mentioned in (16) are the same as those of the invention mentioned in (2).

In the optical pickup device mentioned in (17), the light amount reducing means is a refracting interface or a diffractive structure which is provided on the intermediate optical functional area.

Concerning the light flux passing through the intermediate optical functional area, the light flux is flared at least when recording or reproduction of information is performed for the second optical information recording medium, accordingly, it is possible to record or reproduce information for a plurality of the optical information recording media having various thicknesses of the transparent base boards. Action and effect of the invention mentioned in (17) are the same as those of the invention mentioned in (3).

In the optical pickup device mentioned in (18), the light amount reducing means is a diffractive structure which is provided on the intermediate optical functional area. Concerning the light flux passing through the intermediate optical functional area, the light flux has an under spherical aberration at least when recording or reproduction of information is performed for the second optical information recording medium. Action and effect of the invention mentioned in (18) are the same as those of the invention mentioned in (4).

In the optical pickup device mentioned in (19), when the recording or the reproduction for the first optical information recording media is performed, the spherical aberration for the light rays passing through the intermediate optical functional area is corrected by light amount reducing means. Action and effect of the invention mentioned in (19) are the same as those of the invention mentioned in (5).

In the optical pickup device mentioned in (20), the light amount reducing means is a dichroic filter. Action and effect of the invention mentioned in (20) are the same as those of the invention mentioned in (6).

In the optical pickup device mentioned in (21), the light amount reducing means is a liquid crystal shutter. Action and effect of the invention mentioned in (20) are the same as those of the invention mentioned in (7).

In the optical pickup device mentioned in (22), when recording or reproduction of information is performed for the second optical information recording media, diffractive order number $n_{out}$ of the diffracted light with the highest intensity generated at the diffractive structure of the outer optical functional area and diffractive order number $n_{in}$ of the diffracted light with the highest intensity generated at the diffractive structure of the inner optical functional area satisfy the following formula.

$$|n_{out}| \geq |n_{in}| \tag{2}$$

Action and effect of the invention mentioned in (22) are the same as those of the invention mentioned in (8).

In the optical pickup device mentioned in (23), when a design base wavelength of the diffractive structure in the outer optical functional area is represented by $\lambda_B$, then the formula $0.5\ \lambda_1 < \lambda_B < 1.1\ \lambda_1$ holds. Action and effect of the invention mentioned in (23) are the same as those of the invention mentioned in (9).

In the optical pickup device mentioned in (24) is provided with a first light source, a second light source, a converging optical system, and an optical detector;

the first light source having wavelength $\lambda_1$ emits the light flux to a first optical information recording medium having the thickness $t_1$ of its transparent base board, to record or regenerate information;

the second light source having wavelength $\lambda_2$ ($\lambda_1 < \lambda_2$) emits the light flux to a second optical information recording medium having the thickness $t_2$ ($t_1 < t_2$) of its transparent base board, to record or regenerate information.

the converging optical system has the objective lens which converges the light flux emitted from the first and second light sources on the information recording surfaces through the transparent base boards of the first and second information recording media;

the objective lens is provided with two or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closer to the optical axis among the above-mentioned optical functional areas;

for the light flux passing through the outer optical functional area, the spherical aberration, generated during recording or reproduction for the first optical information recording media, is corrected by the diffractive structure of the outer optical functional area that is farther from the optical axis among the above-mentioned optical functional areas;

the transmittance of the objective lens for the light flux having wavelength $\lambda_2$ passing through the outer optical functional area is not more than 50%. Action and effect of the invention mentioned in (24) are the same as those of the invention mentioned in (10).

In the optical pickup device mentioned in (25), the transmittances of the objective lens for the light flux having wavelength $\lambda_1$ and for the light flux having wavelength $\lambda_2$, passing through the inner optical functional area, are not less than 90%. Action and effect of the invention mentioned in (25) are the same as those of the invention mentioned in (11).

In the optical pickup device mentioned in (26), magnification m1 of the objective lens for recording or reproduction of information for the first optical information recording medium is shown by the following formula.

$$-1/2.5 \geq m1 \geq -1/10 \qquad (3)$$

Further, necessary numerical aperture NA 1 of the first optical information recording medium side is expressed by the following formula.

$$0.65 \geq NA1 \geq 0.55 \qquad (4)$$

Action and effect of the invention mentioned in (26) are the same as those of the invention mentioned in (12).

In the optical pickup device mentioned in (27), magnification m2 of the objective lens for recording or reproduction of information for the second optical information recording media is shown by the following formula.

$$-1/2.5 \geq m2 \geq -1/10 \qquad (5)$$

Further, necessary numerical aperture NA 2 of the second optical information recording medium side is expressed by the following formula.

$$0.57 \geq NA2 \geq 0.43 \qquad (6)$$

Action and effect of the invention mentioned in (27) are the same as those of the invention mentioned in (13).

In the optical pickup device mentioned in (28), the objective lens is made of plastic materials. Action and effect of the invention mentioned in (28) are the same as those of the invention mentioned in (14).

The optical pickup device mentioned in (29) is provided with a first light source, a second light source, a converging optical system, and an optical detector;

the first light source having wavelength $\lambda_1$ emits the light flux to a first optical information recording medium having thickness $t_1$ of its transparent base board, to record or reproduce information;

the second light source having wavelength $\lambda_2$ ($\lambda_1 < \lambda_2$) emits the light flux to a second optical information recording medium having thickness $t_2$ ($t_1 < t_2$) of its transparent base board, to record or reproduce information;

the converging optical system has the objective lens which converges the light fluxes emitted from the first and second light sources on the information recording surfaces through the transparent base boards of the first and second information recording media;

the objective lens is used within the finite magnification m (−0.33<m<−0.10), and is provided with two or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closer to the optical axis among the above-mentioned optical functional areas;

for the light flux passing through the outer optical functional area, the spherical aberration generated during recording or reproduction for the first optical information recording media is corrected by the diffractive structure of the outer optical functional area that is farther from the optical axis among the above-mentioned optical functional areas, and the light flux is flared when recording or reproduction of information is performed for the second optical information recording media;

there is provided a diaphragm which makes the light flux passing through the outer optical functional area to pass with the first transmittance, for the recording or reproduction of information for the first optical information recording medium, and which makes the light flux passing through the inner optical functional area to pass with the second transmittance lower than the first transmittance, for the recording or reproduction of information for the second optical information recording medium, that is, wavelength dependence of the diffractive structure is made to be higher, the overflared part of the light flux for recording or reproduction for the second optical information recording medium is shifted to the under direction; even when the flared part nears the optical axis in consequence, the diaphragm can reduce the light amount passing through the intermediate optical functional area and entering the optical detector, and thereby, the detector which detects the reflected light from the second optical information recording medium hardly detects, which suppresses possibility of erroneous detection. Incidentally, as a diaphragm of this type, there is considered a liquid crystal shutter to which, however, the invention is not limited.

In the optical pickup device mentioned in (30), magnification m1 of the objective lens for recording or reproduction of information for the first optical information recording medium is shown by the following formula.

$$-1/2.5 \geq m1 \geq -1/10 \qquad (3)$$

Further, necessary numerical aperture NA 1 of the first optical information recording medium side is expressed by the following formula.

$$0.65 \geq NA1 \geq 0.55 \qquad (4)$$

Action and effect of the invention mentioned in (30) are the same as those of the invention mentioned in (12).

In the optical pickup device mentioned in (31), magnification m2 of the objective lens for recording or reproduction of information for the second optical information recording media is shown by the following formula, $$-1/2.5 \geq m2 \geq -1/10 \qquad (5)$$

Further, necessary numerical aperture NA 2 of the second optical information recording medium side is expressed by the following formula.

$$0.57 \geq NA2 \geq 0.43 \qquad (6)$$

Action and effect of the invention mentioned in (31) are the same as those of the invention mentioned in (13). Effect of the invention mentioned in (31) is the same as that of the invention mentioned in (13).

In the optical pickup device mentioned in (32), the objective lens is made of plastic materials. Action and effect of the invention mentioned in (32) are the same as those of the invention mentioned in (14).

The information recording and reproduction method mentioned in (33) performs the recording and/or reproduction of information for the first and second optical information recording media, using the optical pickup device which is provided with a first light source, a second light source, a converging optical system, and an optical detector;

the first light source having wavelength $\lambda_1$ emits the light flux to a first optical information recording medium having thickness $t_1$ of its transparent base board, to record or reproduce information;

the second light source having wavelength $\lambda_2$ ($\lambda_1<\lambda_2$) emits the light flux to a second optical information recording medium having thickness $t_2$ ($t_1<t_2$) of its transparent base board, to record or reproduce information;

the converging optical system has the objective lens which converges the light fluxes emitted from the first and second light sources on the information recording surfaces through the transparent base boards of the first and second information recording media;

the objective lens is used within the finite magnification m ($-0.33<m<-0.10$), and is provided with two or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closer to the optical axis among the above-mentioned optical functional areas;

for the light flux passing through the outer optical functional area, the spherical aberration generated during recording or reproduction for the first optical information recording media is corrected by the diffractive structure of the outer optical functional area that is farther from the optical axis among the above-mentioned optical functional areas, and the light flux is flared when the recording or reproduction of information is performed for the second optical information recording medium;

in the outer optical functional area, the transmittance of wavelength $\lambda_2$ is established to be lower than that of wavelength $\lambda_1$. Action and effect of the invention mentioned in (33) are the same as those of the invention mentioned in (1).

The information recording and reproduction method mentioned in (34) performs the recording and reproduction of information for the first and second optical information recording media, using the optical pickup device which is provided with a first light source, a second light source, a converging optical system, and an optical detector;

the first light source having wavelength $\lambda_1$ emits the light flux to a first optical information recording medium having thickness $t_1$ of its transparent base board, to record or reproduce information;

the second light source having wavelength $\lambda_2$ ($\lambda_1<\lambda_2$) emits the light flux to a second optical information recording medium having thickness $t_2$ ($t_1<t_2$) of its transparent base board, to record or reproduce information;

the converging optical system has the objective lens which converges the light fluxes emitted from the first and second light sources on the information recording surfaces through the transparent base boards of the first and second information recording media;

the objective lens is used within the finite magnification m ($-0.33<m<-0.10$), and is provided with three or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closer to the optical axis among the above-mentioned optical functional areas;

for the light flux passing through the outer optical functional area, the spherical aberration generated during recording or reproduction for the first optical information recording media is corrected by the diffractive structure of the outer optical functional area that is farther from the optical axis among the above-mentioned optical functional areas, and the light flux is flared when the recording or reproduction of information is performed for the second optical information recording medium;

in an optical path between the light source and the optical detector, there is provided a light amount reducing means which reduces the light amount entering the optical detector;

when recording or reproduction of information is performed at least for the second optical information recording medium, the light amount reducing means can reduce the amount of light flux entering the optical detector through an intermediate optical functional area which is between the inner optical functional area and the outer optical functional area, when the focusing of the objective lens is performed. Action and effect of the invention mentioned in (34) are the same as those of the invention mentioned in (2).

In the information recording and reproduction method mentioned in (35), the light amount reducing means is the refracting interface or the diffractive structure provided on the intermediate optical functional area, and further, the light flux passing through the intermediate optical functional area is flared at least when the recording and reproduction of information is performed for the second optical information recording medium. Action and effect of the invention mentioned in (35) are the same as those of the invention mentioned in (3).

In the information recording and reproduction method mentioned in (36), the light amount reducing means is a diffractive structure which is provided on the intermediate optical functional area.

Concerning the light flux passing through the intermediate optical functional area, the light flux has an under spherical aberration at least when recording or reproduction of information is performed for the second optical information recording medium. Action and effect of the invention mentioned in (36) are the same as those of the invention mentioned in (4).

In the information recording and reproduction method mentioned in (37), when recording or reproduction of information is performed for the first optical information recording media, spherical aberration concerning the light flux passing through the intermediate optical functional area is corrected by the light amount reducing means.

Action and effect of the invention mentioned in (37) are the same as those of the invention mentioned in (5).

In the information recording and reproduction method mentioned in (38), the light amount reducing means is a dichroic filter. Action and effect of the invention mentioned in (38) are the same as those of the invention mentioned in (6).

In the information recording and reproduction method mentioned in (39), the light amount reducing means is a liquid crystal shutter. Action and effect of the invention mentioned in (39) are the same as those of the invention mentioned in (7).

In the information recording and reproduction method mentioned in (40), when recording or reproduction of information is performed for the second optical information recording media, diffractive order number $n_{out}$ of the diffracted light with the highest intensity generated at the diffractive structure of the outer optical functional area, and diffractive order number $n_{in}$ of the diffracted light with the highest intensity generated at the diffractive structure of the inner optical functional area satisfy the following formula.

$$|n_{out}| \geq |n_{in}| \quad (2)$$

Action and effect of the invention mentioned in (40) are the same as those of the invention mentioned in (8).

In the information recording and reproduction method mentioned in (41), when a design base wavelength of the diffractive structure in the outer optical functional area is represented by $\lambda_B$, then the formula $0.5\lambda_1 < \lambda_B < 1.1\lambda_1$ holds.

Action and effect of the invention mentioned in (41) are the same as those of the invention mentioned in (9).

The information recording and reproduction method mentioned in (42) performs the recording and reproduction of information for the first and second optical information recording media, using the optical pickup device which is provided with a first light source, a second light source, a converging optical system, and an optical detector;

the first light source having wavelength $\lambda_1$ emits the light flux to a first optical information recording medium having thickness $t_1$ of its transparent base board, to record or reproduce information;

the second light source having wavelength $\lambda_2$ ($\lambda_1 < \lambda_2$) emits the light flux to a second optical information recording medium having thickness $t_2$ ($t_1 < t_2$) of its transparent base board, to record or reproduce information;

the converging optical system has the objective lens which converges the light fluxes emitted from the first and second light sources on the information recording surfaces through the transparent base boards of the first and second information recording media;

the objective lens is used within the finite magnification m (−0.33<m<−0.10), and is provided with two or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closer to the optical axis among the above-mentioned optical functional areas;

for the light flux passing through the outer optical functional area, the spherical aberration, generated during recording or reproduction for the first optical information recording media, is corrected by the diffractive structure of the outer optical functional area that is farther from the optical axis among the above-mentioned optical functional areas;

the transmittance of the objective lens for the light flux having wavelength $\lambda_2$ passing through the outer optical functional area is not more than 50%. Action and effect of the invention mentioned in (42) are the same as those of the invention mentioned in (10).

In the information recording and reproduction method mentioned in (43), the transmittance of the objective lens is not less than 90% for the light flux having wavelength $\lambda_1$ and wavelength $\lambda_2$ which passes through the inner optical functional area. Action and effect of the invention mentioned in (43) are the same as those of the invention mentioned in (11).

In the information recording and reproduction method mentioned in (44), magnification m1 of the objective lens for recording or reproduction of information for the first optical information recording medium is shown by the following formula.

$$-1/2.5 \geq m1 \geq -1/10 \quad (3)$$

Further, necessary numerical aperture NA 1 of the first optical information recording medium side is expressed by the following formula.

$$0.65 \geq NA1 \geq 0.55 \quad (4)$$

Action and effect of the invention mentioned in (44) are the same as those of the invention mentioned in (12).

In the information recording and reproduction method mentioned in (45), magnification m2 of the objective lens for recording or reproduction of information for the second optical information recording media is shown by the following formula.

$$-1/2.5 \geq m2 \geq -1/10 \quad (5)$$

Further, necessary numerical aperture NA 2 of the second optical information recording medium side is expressed by the following formula.

$$0.57 \geq NA2 \geq 0.43 \quad (6)$$

Action and effect of the invention mentioned in (45) are the same as those of the invention mentioned in (13).

In the optical pickup device mentioned in (46), the objective lens is made of plastic materials. Action and effect of the invention mentioned in (46) are the same as those of the invention mentioned in (14).

The information recording and reproduction method mentioned in (47) performs the recording and reproduction of information for the first and second optical information recording media, using the optical pickup device which is provided with a first light source, a second light source, a converging optical system, and an optical detector;

the first light source having wavelength $\lambda_1$ emits the light flux to a first optical information recording medium having thickness $t_1$ of its transparent base board, to record or reproduce information;

the second light source having wavelength $\lambda_2$ ($\lambda_1 < \lambda_2$ emits the light flux to a second optical information recording medium having thickness $t_2$ ($t_1 < t_2$) of its transparent base board, to record or reproduce information;

the converging optical system has the objective lens which converges the light fluxes emitted from the first and second light sources on the information recording surfaces through the transparent base boards of the first and second information recording media;

the objective lens is used within the finite magnification m (−0.33<m<−0.10), and is provided with three or more optical functional areas where the diffractive structures are arranged in the direction crossing the optical axis;

for the light flux passing through the inner optical functional area, the spherical aberration, generated during recording or reproduction for each of the optical information recording media, is corrected by the diffractive structure of the inner optical functional area closer to the optical axis among the above-mentioned optical functional areas;

for the light flux passing through the outer optical functional area, the spherical aberration, generated during recording or reproduction for the first optical information recording media, is corrected by the diffractive structure of the outer optical functional area that is farther from the optical axis among the above-mentioned optical functional areas, and the light flux is flared when the recording or reproduction of information is performed for the second optical information recording medium. Further, since there is provided a diaphragm, the light flux passing through the outer optical functional area passes with the first transmittance, for the recording or reproduction of information for the first optical information recording medium, and the light flux passing through the inner optical functional area passes with the second transmittance lower than the first transmittance, for the recording or reproduction of information for the second optical information recording medium. Action and effect of the invention mentioned in (47) are the same as those of the invention mentioned in (29).

In the information recording and reproduction method mentioned in (48), magnification m1 of the objective lens for recording or reproduction of information for the first optical information recording medium is shown by the following formula.

$$-1/2.5 \geq m1 \geq -1/10 \qquad (3)$$

Further, necessary numerical aperture NA 1 of the first optical information recording medium side is expressed by the following formula.

$$0.65 \geq NA1 \geq 0.55 \qquad (4)$$

Action and effect of the invention mentioned in (48) are the same as those of the invention mentioned in (12).

In the information recording and reproduction method mentioned in (49), magnification m2 of the objective lens for recording or reproduction of information for the second optical information recording media is shown by the following formula.

$$-1/2.5 \geq m2 \geq -1/10 \qquad (5)$$

Further, necessary numerical aperture NA 2 of the second optical information recording medium side is expressed by the following formula, $$0.57 \geq NA2 \geq 0.43 \qquad (6)$$

Action and effect of the invention mentioned in (49) are the same as those of the invention mentioned in (13).

In the information recording and reproduction method mentioned in (50), the objective lens is made of plastic materials.

Action and effect of the invention mentioned in (50) are the same as those of the invention mentioned in (14).

In the present specification, when the "optical functional area" is expressed by the spherical aberration, if the spherical aberration comes under either one of the following cases, let it be assumed that the different optical functional areas exist, which are separated by a boundary h.

(a) The spherical aberration is discontinuous at the boundary h (FIG. 1(a)).

(b) The spherical aberration is continuous at the boundary h, but the first-order differential of the spherical aberration is discontinuous (FIG. 1(b)).

(c) The spherical aberration is discontinuous at the boundary h for a certain wavelength (FIG. 1(c)).

Further, the area separated by the above-mentioned conditions where each light flux passes is regarded as the "optical functional area". Accordingly, when observing a surface of the lens, if there exist a refractive section and a diffractive section (diffractive structure), it is assumed that the different optical functional areas exist, with the boundary between the refractive section and the diffractive section (see FIGS. 2(a) and (b)). Still further, even if the diffractive structure is formed on the whole surface, when the structures designed by the different purpose are made to co-exist, let it be assumed that they are the different "optical functional areas" in accordance with the above-mentioned condition (c) (see FIG. 2(b)). Still further, even if an aspheric surface having the same aspherical coefficient is formed on the surface of one side, when the surface of the other side has the discontinuous section, let it be assumed that they are the different optical surfaces. Incidentally, two optical functional areas can be arranged in the direction crossing the optical axis (FIG. 2(d)), or three or more optical functional areas can be arranged (FIGS. 2(a) to (c)).

As for "the under spherical aberration or the over spherical aberration", let it be assumed that "under" means the case that the graph crosses the optical axis before the paraxial image point, while "over" means the case that the graph crosses the optical axis after the paraxial image point, in the spherical aberration having the position of a paraxial image point as the origin, as shown in FIG. 3.

The "diffractive structure" used in the present specification means the section which is provided with relief on the surface of the objective lens and has the function to converge or diverge the light flux by diffraction. Concerning the form of relief, as shown in FIG. 2(b), for example, there is known the shape wherein ring-shaped zones are formed to be the concentric circulars on the optical axis representing the center, and when its section on a plane including an optical axis is viewed, each ring-shaped zone is like the saw-tooth. The form of relief includes above-mentioned shape, and this shape is named "the diffractive ring-shaped zone" especially.

In the present specification, in a narrow sense, the objective lens means the lens having light converging function and being arranged to face the optical information recording medium at the closest position to the optical information recording medium, under the condition that the optical information recording medium is installed on the optical pickup device. In a wide sense, the objective lens means the lens group which can be moved by an actuator together with the lens at least in the direction of the optical axis of the lens. Here, such lens group means at least one or more lens pieces (for example, two pieces). Accordingly, in the present specification, the numerical aperture NA of the objective lens on the optical information recording medium side (an image side) means the numerical aperture NA of the lens surface of the objective lens positioned to be closest to the optical information recording medium. Further, in the present specification, the necessary numerical aperture NA means the numerical aperture which is regulated by the standard of each optical information recording medium, or means the numerical aperture of the objective lens having the diffractive limit power which can obtain the spot diameter necessary to perform recording or reproduction of information for each of the optical information recording media, in accordance with the wavelength of the light source to be used.

In the present specification, the second optical information recording medium means the optical disks of various CD groups representing, for example, CD-R, CD-RW, CD-Video and CD-ROM, while the first optical information recording medium means the optical disks of various DVD groups representing DVD-ROM, DVD-RAM, DVD-R, DVD-RW and DVD-Video. Still further, in the present specification, when the thickness t of the transparent base board is expressed, it includes the case of t=0.

BRIEF DESCRIPTION OF THE DRAWINGS

FIG. 5(a) is a perspective view showing the light flux radiated on the optical detector, of FIG. 5(b) is drawing of the divided detecting surfaces of the optical detector, and FIG. 5(c) is a drawing showing the output signal of the optical detector.

FIG. 9 shows drawings of the spherical aberration of the objective lens of the example 2.

FIG. 11 shows drawings of the spherical aberration of the objective lens of the example 3.

FIG. 12 shows the simulation result of the objective lens defocusing signal, that is, graph (a) is the case that the intermediate optical functional area is structured with the different diffraction surface of the outer optical functional area, and graph (b) is the case that the intermediate optical functional area is structured with the same diffraction surface of the outer optical functional area.

DETAILED DESCRIPTION OF THE PREFERRED EMBODIMENT

Figure 1A:
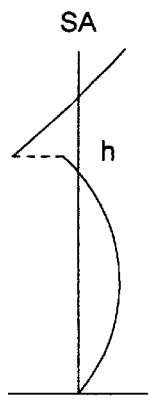
FIG. 1 is drawings showing the spherical aberration under the discontinuous condition.
Figure 1B:
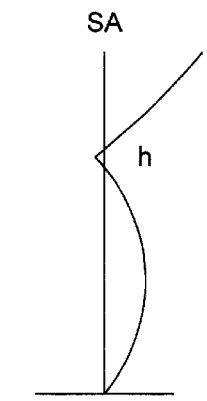
Figure 1C:
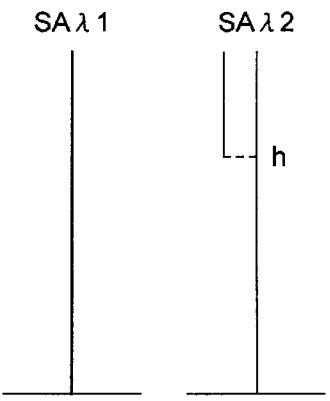

Referring to the drawings, the present invention will be described in detail below.

The First Embodiment

Figure 4:
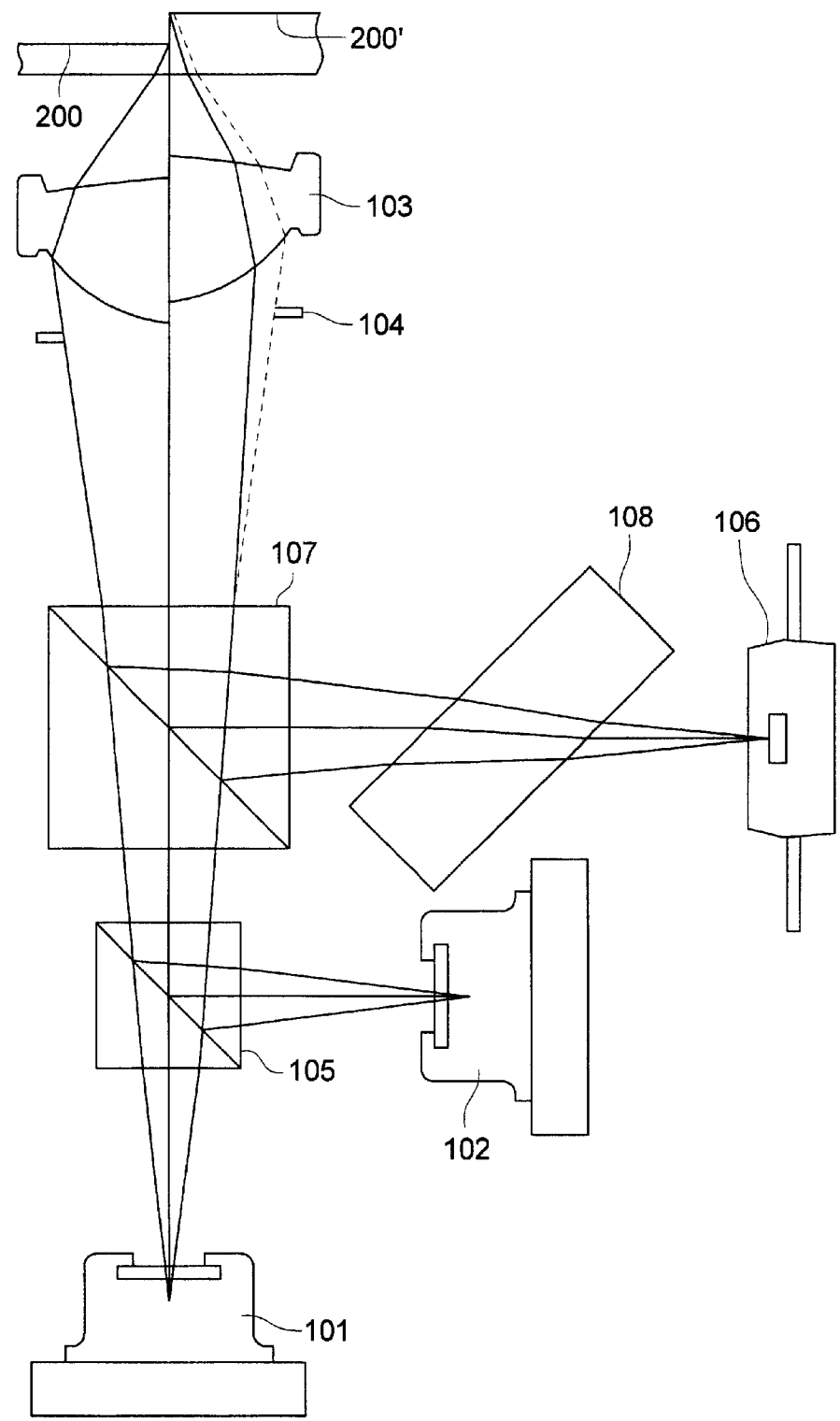
FIG. 4 is a schematic structural drawing of the optical pickup device of the present embodiment.

The first embodiment will be explained. FIG. 4 is a schematic structural drawing of the optical pickup device including the objective lens of the present embodiment. The optical pickup device which keeps interchangeability between DVD representing the first optical information recording medium having high recording density and CD representing the second optical information recording medium having low recording density is provided with first light source 101 for DVD, second light source 102 for CD, objective lens 103, diaphragm 104 which introduces light flux having same diameter for DVD and CD into the objective lens 103, and beam splitter 105 representing light path combining means which introduces the light flux for DVD and CD respectively to the objective lens 103. The light flux emitted from each of the light sources 101 and 102 passes through the beam splitter 105 and the diaphragm 104, and forms the converged spot on an information recording surface (numeral 200 is for DVD, and numeral 200' is for CD) of each of the optical information recording media through the objective lens 103. Incidentally, diverged light is incident on the objective lens 103, that is, the lateral magnification m of the objective lens 103 is smaller than 0.

The defocus position control for the objective lens 103 is performed by an unillustrated actuator. The defocus position control is a feedback control of incident light distribution on light detector 106 arranged on the conjugate point of the converged spot of reflected light. More concretely, the light flux reflected on the recording surfaces 200 and 200' of the optical information recording media, then is reflected on the beam splitter 107 through the objective lens 103 and diaphragm 104 which are movable in the direction of the optical axis, passes through plane-parallel plate 108, and is detected by the optical detector 106, so that the focused position of the objective lens 103 is judged and the focusing control is carried out.

Figure 5:
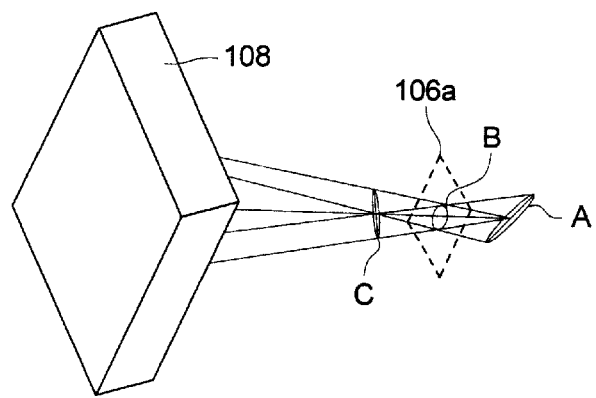
FIG. 5 shows drawings showing the detecting modes of the optical detector 106 using astigmatism method for the example of the focusing control.
Figure 5:
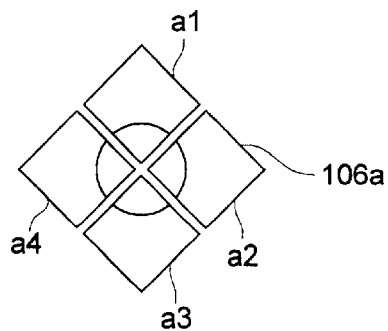
Figure 5:
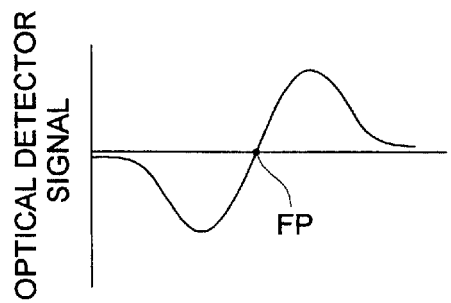

FIG. 5 is a drawing showing a detecting mode for the optical detector 106 in which astigmatism method is employed as an example of the focusing control, in which FIG. 5(a) is a schematic perspective view showing the light flux being incident on the optical detector, FIG. 5(b) shows divided detecting surfaces of the optical detector, and FIG. 5(c) shows an output signal of the optical detector. On a returning optical system (the optical system between the recording surfaces 200 and 200' of the optical information recording media and the optical detector 106) as shown in FIG. 4, the spot on the detecting surface of the optical detector 106 changes the shape to long ellipse A, circle B, and wide ellipse C, by astigmatism generated by the plane-parallel plate 108, in accordance with the change of the position of the objective lens 103. By dividing the spot detecting surface 106a into four parts as shown in FIG. 5(b), and by calculating the detected signals on each of the parts, the invention can determine the shape of the spot. To put it concretely, on a curve shown in FIG. 5(c), the spot becomes circle B at the position of FP, which means that the objective lens is in the focused position. As away from the position FP, the signal value increases to a plus or minus side, and it is understood that the shape of the spot changes to long ellipse A or wide ellipse C.

Accordingly, the focusing control of the optical pickup device is carried out by determination of the position FP in accordance with the wave form shown in FIG. 5(c). However, though the wave form shown in FIG. 5(c) is an ideal curve, the shape of the real curve obtained may be deformed in accordance with light amount incident on the optical detector 106. When flared light comes near the optical axis especially in the case of CD, the shape of the curve tends to be deformed. Therefore, the present embodiment is devised to prevent flared light from entering the optical detector 106, when CD is used.

Objective lens 103 is a plastic lens both of whose surfaces are aspherical, and is provided with the diffractive structures on an aspheric surface closer to the light source. The different diffractive structures are provided on the area (the inner optical functional area) within the distance h from the optical axis, and the area (the outer optical functional area) outside the distance h from the optical axis (see FIG. 2(d)). The inner optical functional area is provided with the diffractive structure which corrects the spherical aberration under the conditions (magnification, wavelength of light source and thickness of the transparent base board) of use of DVD and CD respectively. Since the wavelength to be used is different between DVD and CD for information recording/reproduction, it is possible to correct each of the spherical aberrations by the appropriate design of the power of the diffractive structure and the power of the refractive section. In the inner optical functional area, to make the diffractive orders for DVD use and CD use to be the same order is preferable from the view point of each of the optical utilization efficiencies for DVD and CD, and to use the lower diffractive order (first-order) prevents the reduction of the diffractive efficiency caused by the difference of the designing wavelength of the diffractive structure.

Figure 6:
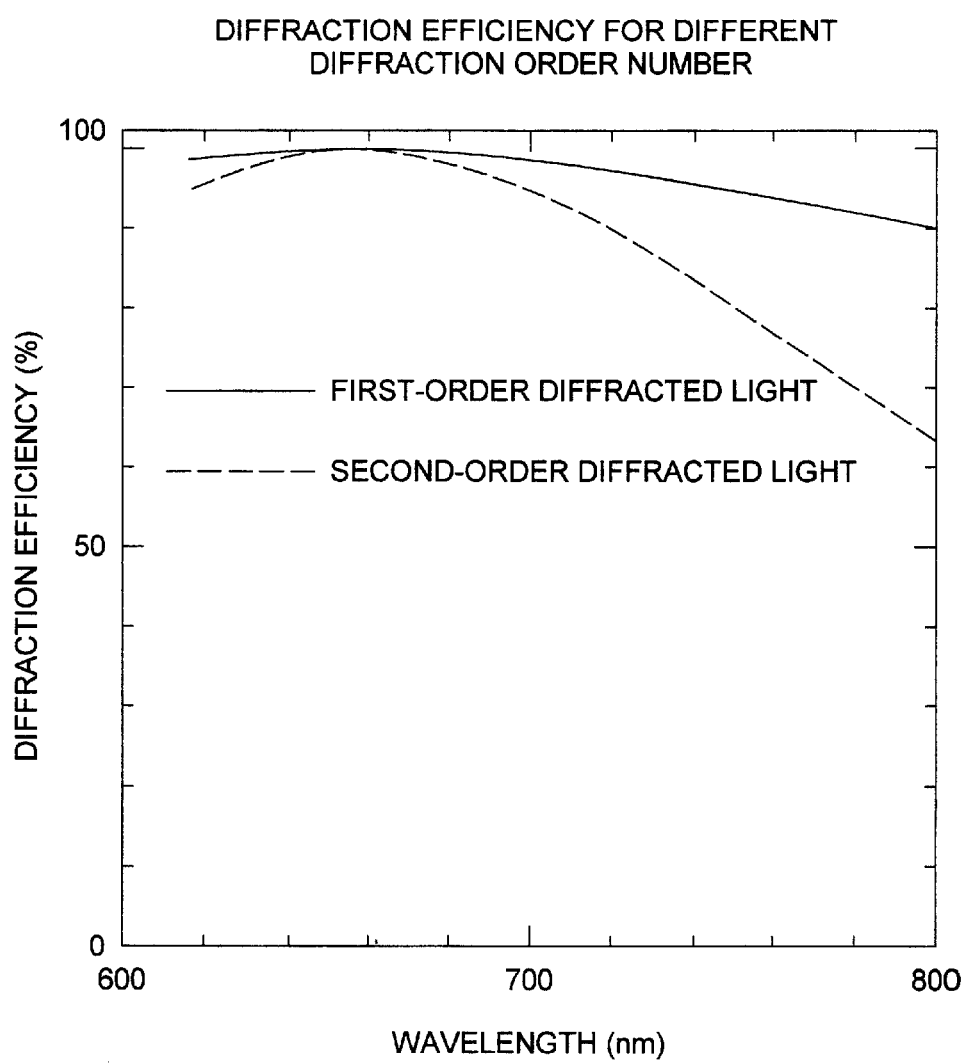
FIG. 6 is a drawing showing the relationship between the diffractive efficiency and the wavelength concerning the first-order diffracted light and the second-order diffracted light, when the designing wavelength is established to be the same as the wavelength when DVD is used.

The outer optical functional area being outside the distance h from the optical axis corrects the spherical aberration when DVD is used, and makes the spherical aberration to be over-flared when CD is used, which are mentioned above. As the means to reduce the light amount entering the optical detector 106, in the case that the flared light comes near the optical axis when CD is used, it is possible to use the diffractive structure which is established to be the higher diffractive order number so that the wavelength dependence of the diffractive efficiency may be intensified (to make the intensity of the diffracted light in the present order to be the highest). The selection of the high ordered diffractive order number when CD is used can establish the diffractive efficiency to be lower, while keeping the diffractive efficiency when DVD is used to be higher. Due to this, an amount of flared light entering the optical detector 106 when CD is used is reduced. FIG. 6 shows the relationship between the diffractive efficiency and the wavelength concerning the first-order diffracted light and the second-order diffracted light, when the designing wavelength is established to be the same as the wavelength when DVD is used.

Generally speaking, the higher the order is, the higher the wavelength dependence is, and the design of higher ordered diffraction requires the deeper step amount of the diffractive ring-shaped zone, therefore from the lens manufacturing, lower order is preferable. That is, as the total matter, it is preferable to use the second or third ordered diffracted light.

The Second Embodiment

The second embodiment will be explained. Incidentally, the matter which is different from the first embodiment is the designed section about the outer area of the objective lens, and the matter which is the same as the first embodiment will not be explained.

In the outer optical functional area which is outside the distance h from the optical axis, in order to correct the spherical aberration when DVD is used, and as the light amount reducing means which reduces the flared light of CD entering the optical detector, the embodiment is provided with the diffractive structure whose design-based wavelength $\lambda_B$ is established to be shorter than the light source wavelength $\lambda_1$ for DVD, and by doing this, it is possible to reduce further the diffractive efficiency when CD is used, when compared with the case that the design-based wavelength $\lambda_B$ is established to be equal to the light source wavelength $\lambda_1$ for DVD. Due to this, an amount of flared light entering the optical detector 106 when CD is used can further be reduced by this reason. The above-mentioned tendency is independent of the diffractive order number. Accordingly, it is clear that the higher diffractive order number can be used.

The Third Embodiment

The third embodiment will be explained. Incidentally, the matter which is different from the above-mentioned embodiment is the designed section about the objective lens, and the matter which is the same as the above-mentioned embodiment will not be explained.

The objective lens 103 is a plastic lens both of whose surfaces are aspherical, and is provided with the diffractive structure on the surface facing the light source. This diffractive structure is provided on each of the different optical functional areas which are separated by the boundaries of distance h1 and h2 from the optical axis (see FIG. 2(b)). The diffractive structure of the innermost inner optical functional area is one corrected in terms of spherical aberrations for use of DVD and CD respectively, and is of the same diffractive order number (the first-order). While the diffractive structure of the outermost outer optical functional area is for the correction of the spherical aberration when DVD is used, and it is one in which the spherical aberration is over-flared when CD is used. Here, the diffractive structure of the intermediate optical functional area constituting the light amount reducing means shows an occasion where an amount of light is reduced by enlarging the flare shape when CD is used, while correcting the spherical aberration when DVD is used. As a result, the inside diameter of the flare increases, and noise component of defocusing of the objective lens will be reduced, when CD is used.

The invention is not limited to the present embodiment. For example, it is possible to constitute the intermediate optical functional area with the refracting interface (see FIG. 2(a)), and thereby to make over flare when CD is used, by correcting the spherical aberration when DVD is used, or it is possible to constitute the diffractive structure on, which can make the diffractive efficiency to be lower in the intermediate optical area when CD is used. Or, it is possible to provide a coating having lower transmittance for the light flux for CD only on the surface (CT in FIG. 2(a)) of the objective lens from which the light flux passing through the intermediate optical area emerges. Because it is enough to make the transmittance for the light flux for CD to be lower.

The Fourth Embodiment

The fourth embodiment will be explained. Incidentally, the matter which is the same as the above-mentioned embodiment will not be explained.

In the first embodiment, for example, in order to make the influence of the flared light to be small when CD is used, it is conceivable that the light flux passing through the outer optical functional area is shaded or the transmittance is reduced, when CD is used. To put it concretely, it is possible to use one such as a liquid crystal shutter which can change the numerical aperture when the voltage is changed in accordance with information recording light or information recording medium, or a diffractive filter having binary form can be used, and it is preferable to provide a diaphragm which can change the transmittance with the wavelength. In the case of the diffractive filter having the binary form, the transmittance can be established to be higher for the wavelength for DVD by control of a step, while the transmittance can be established to be lower for the wavelength for CD. The liquid crystal shutter and the diffractive filter having the binary form are so well known that their details will not be explained.

The examples of the present invention will be explained as follows.

EXAMPLE 1

The present example relates to the first embodiment mentioned above, and in particular, to DVD as the first optical information recording medium having a high recording density, CD as the second information recording medium having a low recording density, and the objective lens which can record or reproduce information for DVD and CD.

For DVD, the transparent base board thickness of the optical information recording medium is 0.6 mm, the necessary numerical aperture NA1=0.60, and the wavelength of light source $\lambda_1$=655 nm, while for CD, the transparent base board thickness of the optical information recording medium is 1.2 mm, the necessary numerical aperture NA2=0.45, and the wavelength of light source $\lambda_2$=785 nm.

Both surfaces of the objective lens are aspherical shown by [formula 1]. Incidentally, Z is an axis parallel to the optical axis, h is an axis perpendicular to the optical axis, r is a paraxial radius of curvature, κ is a constant of the cone, A is an aspherical constant, and P is number of powers of an aspheric surface.

$$Z = \frac{h^2/R^0}{1 + \sqrt{1 - (1+\kappa)(h/R_0)^2}} + \sum_{i=1}^{\infty} A_i h^{P_i} \quad \text{[formula 1]}$$

Further, the diffractive structure is formed solidly on the aspheric surface of the objective lens on the light source side of the objective lens. The diffractive structure is expressed by [formula 2] which is a phase-difference function $\Phi_b$ with an unit of radian. The paraxial power of the diffractive section is expressed by the second-order coefficient. Further, coefficients other than the second-order coefficient such as fourth order or sixth order coefficient can control the spherical aberration. Here, "to control" means that the spherical aberration existing in the refractive section is given the spherical aberration having the opposite characteristic in the diffractive section to correct the aberration in total, or means that the total spherical aberration is made to be the desired total flare amount through the operation of the spherical aberration in the diffractive section. In this case, it can be thought that the spherical aberration caused by the temperature change is the total of the spherical aberration caused by temperature change in the refractive section and the spherical aberration caused by temperature change in the diffractive section.

$$\Phi_b = \sum_{i=1}^{\infty} b_{2i} h^{2i} \quad \text{[formula 2]}$$

In the outer optical functional area being outside the distance h from the optical axis and the inner optical functional area being inside the distance h, there are formed the diffractive structures having different objects each other. The diffractive structure of the inner optical functional area is corrected in terms of spherical aberration for the light flux passing through this area in the case of using DVD and CD respectively. Since this inner optical functional area is used for both of the DVD and CD, the use of the same ordered diffractive order number is preferable for the light using efficiency, accordingly, the first-order diffracted light is used in the present example.

On the other hand, the light flux passing through the outer optical functional area is used only for DVD, accordingly, the spherical aberration is corrected when DVD is used, and the light flux is over-flared when CD is used. Here, in the outer optical functional area, the diffraction efficiency for light having the wavelength used for CD is set to be lower than that for DVD, by using, for example, the second-order diffractive light. As understood in FIG. 6, when the designing wavelength is set to be the wavelength for DVD use, the diffraction efficiency for the wavelength for CD use is lowered when using the high ordered diffractive order number.

Figure 7:
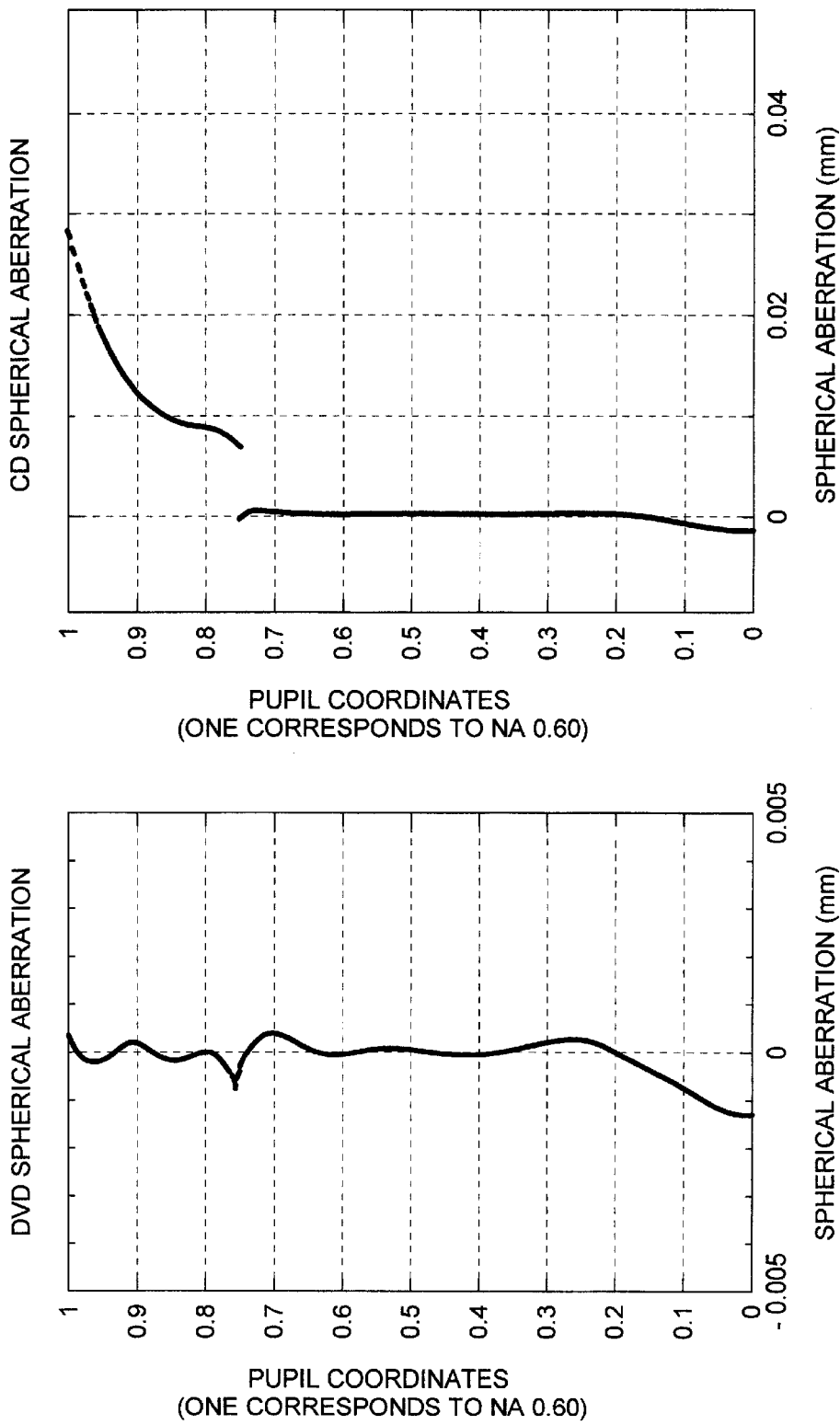
FIG. 7 shows drawings of the spherical aberration of the objective lens of the example 1.
Figure 8:
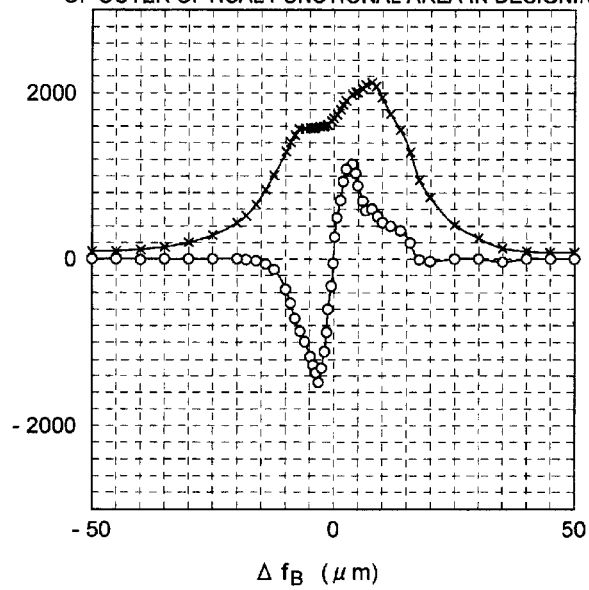
FIG. 8 shows drawings showing the compared result between the designed case (a) that the diffractive order number of the outer optical functional area is the second-order, and the designed case (b) of the first-order, while the inner optical functional area is kept to have the same ordered diffractive order number, when the simulation of the objective lens defocus signal is performed in the case of using CD.
Figure 8:
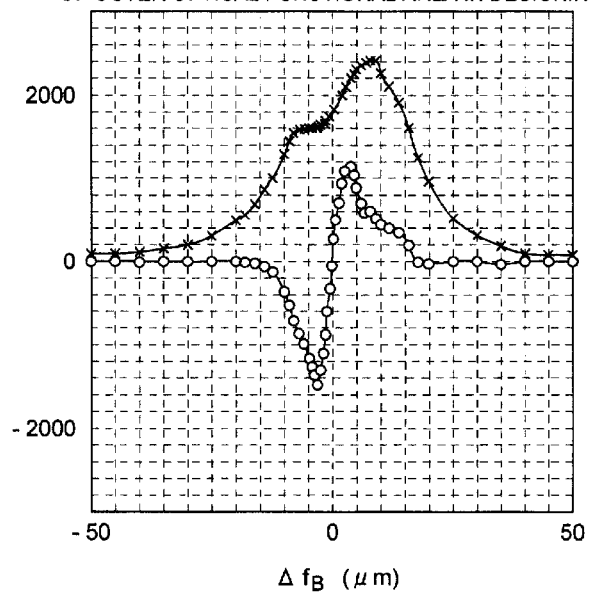

The lens data of the objective lens used for the present example is shown in Table 2, and the drawings of the spherical aberrations are shown in FIG. 7. When the simulation of the objective lens defocusing signal is performed practically in the case of using CD, FIG. 8 shows the results of comparison between the designed case (a) that the diffractive order number of the outer optical functional area is the second-order, an the designed case (b) of the first-order, while the inner optical functional area is kept to have the same ordered diffractive order number. In FIG. 8, the vertical axis represents the signal value of the optical detector, and the horizontal axis represents the amount of movement of the objective lens (hereinafter the same applies to the same figures). As it is clear from this figure, in the outer optical functional area, the noise signal generated in defocusing when CD is used is reduced by the use of flared light with the high ordered diffractive order number when CD is used.

TABLE 2

| | Example 1 lens data | | | |
|---|---|---|---|---|
| | $F_1$ = 3.40 mm | | $m_1$ = −1/6.8 | |
| $i_{th}$ surface | ri | di (655 nm) | ni (655 nm) | di (785 nm) | ni (785 nm) |

TABLE 2-continued

Example 1 lens data $F_1 = 3.40$ mm $\quad\quad m_1 = -1/6.8$

| | | | | | | |
|---|---|---|---|---|---|---|
| 0 | | 25.82807 | | 26.21515 | | |
| 1 | ∞ | 0.0 | 1.0 | 0.0 | 1.0 | Diameter of an aperture of diaphragm 4.574 mm |
| 2 | 2.38696 | 2.9 | 1.54094 | 2.9 | 1.53716 | |
| 2' | 2.43301 | 2.89186 | 1.54094 | 2.89186 | 1.53716 | |
| 3 | −5.0024 | 2.02682 | 1.0 | 1.63974 | 1.0 | |
| 4 | ∞ | 0.6 | 1.57752 | 1.2 | 1.57063 | |
| 5 | ∞ | | | | | |

Data of aspheric surface

The 2nd surface (0 < h < 1.77653 mm: DVD/CD common area)
Aspheric surface coefficient

| | | |
|---|---|---|
| κ | −4.8740 × E − 1 | |
| A1 | −2.6458 × E − 3 | P1 4.0 |
| A2 | +1.8535 × E − 4 | P2 6.0 |
| A3 | −5.2811 × E − 4 | P3 8.0 |
| A4 | +2.2666 × E − 4 | P4 10.0 |
| A5 | −4.7529 × E − 5 | P5 12.0 |
| A6 | +4.0351 × E − 6 | P6 14.0 |

Optical path difference function (coefficient of optical path difference function: standard wavelength 720 nm)

| | |
|---|---|
| B2 | −5.2503 × E − 0 |
| B4 | −1.2037 × E − 0 |
| B6 | +2.3295 × E − 2 |
| B8 | −2.5110 × E − 2 |
| B10 | +4.2122 × E − 3 |

The 2'nd surface (1.77653 mm < h: DVD exclusive area)
Aspheric surface coefficient

| | | |
|---|---|---|
| κ | −8.2330 × E − 1 | |
| A1 | +1.1653 × E − 2 | P1 4.0 |
| A2 | −7.0244 × E − 3 | P2 6.0 |
| A3 | +2.0291 × E − 3 | P3 8.0 |
| A4 | −2.8150 × E − 4 | P4 10.0 |
| A5 | +1.5360 × E − 5 | P5 12.0 |
| A6 | −6.0691 × E − 8 | P6 14.0 |

Optical path difference function (coefficient of optical path difference function: standard wavelength 655 nm)

| | |
|---|---|
| B2 | +4.7541 × E − 0 |
| B4 | −3.8635 × E − 0 |
| B6 | +1.5428 × E − 0 |
| B8 | −3.1025 × E − 1 |
| B10 | +2.1616 × E − 2 |

The 3rd surface
Aspheric surface coefficient

| | | |
|---|---|---|
| κ | −1.90222 × E − 0 | |
| A1 | +2.23498 × E − 2 | P1 4.0 |
| A2 | −1.11325 × E − 2 | P2 6.0 |
| A3 | +5.18333 × E − 3 | P3 8.0 |
| A4 | −1.48863 × E − 3 | P4 10.0 |
| A5 | +2.17667 × E − 4 | P5 12.0 |
| A6 | −1.25321 × E − 5 | P6 14.0 |

Further, under the condition that the objective lens has the finite magnification and is made of plastic, and that the required numerical aperture of the optical information recording medium is 0.60, and further that there is temperature change (including the shift of oscillated wavelength of the laser light source), the changed amount of the spherical aberration was 0.039 $\lambda_1$ rms, which is excellent.

EXAMPLE 2

The present example relates to the second embodiment mentioned above, and in particular, to the objective lens which obtains the interchangeability of use between DVD as the first optical information recording medium having a high recording density, and CD as the second information recording medium having a low recording density. The parts overlapped with the first example are not explained.

Since the present example establishes the designing wavelength (the wavelength for designing the shape of the diffractive structure) to be shorter than DVD wavelength in the diffractive structure of the outer optical functional area, the present example can reduce the noise generated by the light flux passing through the outer area when CD is used.

Figure 10:
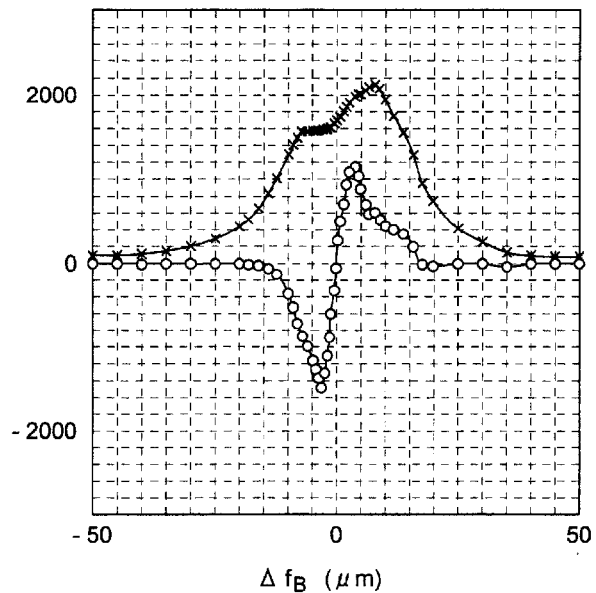
FIG. 10 shows drawings showing the comparison between the case (a) wherein the designing wavelength of the diffractive structure of the outer optical functional area is 655 nm being shorter than DVD wavelength (525 nm), and the case (b) wherein the designing wavelength of the diffractive structure of the outer optical functional area is equal to DVD wavelength, when the simulation of the objective lens defocus signal is performed in the case of using CD.
Figure 10:
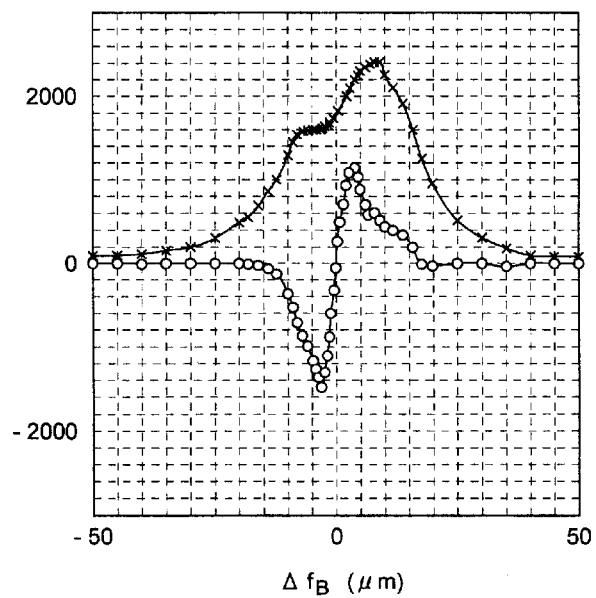

The lens data of the objective lens of the present example are shown in Table 3, and the drawings of the spherical aberrations are shown in FIG. 9. By performing the practical simulation of the objective lens defocusing signal for CD, there are shown the case (a) wherein the designing wavelength of the diffractive structure of the outer optical functional area is 525 nm shorter than DVD wavelength (655 nm), and the case (b) wherein the designing wavelength of the diffractive structure of the outer optical functional area is equal to DVD wavelength to be used, which are compared and shown in FIG. 10. As cleared by the drawings, in the outer optical functional area, the establishment of the designing wavelength of the diffractive structure to be shorter than the DVD wavelength to be used can reduce the noise signal while defocusing in the condition of using CD.

TABLE 3

Example 2 lens data $F_1 = 3.40$ mm $\quad\quad m_1 = -1/6.8$

| $i_{th}$ surface | ri | di (655 nm) | ni (655 nm) | di (785 nm) | ni (785 nm) | |
|---|---|---|---|---|---|---|
| 0 | | 25.82807 | | 26.21515 | | |
| 1 | ∞ | 0.0 | 1.0 | 0.0 | 1.0 | Diameter of an aperture of diaphragm 4.574 mm |
| 2 | 2.38696 | 2.9 | 1.54094 | 2.9 | 1.53716 | |
| 2' | 2.43301 | 2.89186 | 1.54094 | 2.89186 | 1.53716 | |
| 3 | −5.0024 | 2.02682 | 1.0 | 1.63974 | 1.0 | |
| 4 | ∞ | 0.6 | 1.57752 | 1.2 | 1.57063 | |
| 5 | ∞ | | | | | |

Data of aspheric surface

The 2nd surface (0 < h < 1.77653 mm: DVD/CD common area)
Aspheric surface coefficient

| | | |
|---|---|---|
| κ | −4.8740 × E − 1 | |
| A1 | −2.6458 × E − 3 | P1 4.0 |
| A2 | +1.8535 × E − 4 | P2 6.0 |
| A3 | −5.2811 × E − 4 | P3 8.0 |
| A4 | +2.2666 × E − 4 | P4 10.0 |
| A5 | −4.7529 × E − 5 | P5 12.0 |
| A6 | +4.0351 × E − 6 | P6 14.0 |

Optical path difference function (coefficient of optical path difference function: standard wavelength 720 nm)

| | |
|---|---|
| B2 | −5.2503 × E − 0 |
| B4 | −1.2037 × E − 0 |
| B6 | +2.3295 × E − 2 |
| B8 | −2.5110 × E − 2 |
| B10 | +4.2122 × E − 3 |

The 2'nd surface (1.77653 mm < h: DVD exclusive area)
Aspheric surface coefficient

| | | |
|---|---|---|
| κ | −8.2330 × E − 1 | |
| A1 | +1.1653 × E − 2 | P1 4.0 |
| A2 | −7.0244 × E − 3 | P2 6.0 |
| A3 | +2.0291 × E − 3 | P3 8.0 |
| A4 | −2.8150 × E − 4 | P4 10.0 |
| A5 | +1.5360 × E − 5 | P5 12.0 |
| A6 | −6.0691 × E − 8 | P6 14.0 |

Optical path difference function (coefficient of optical path difference function: standard wavelength 525 nm)

| | |
|---|---|
| B2 | +4.7541 × E − 0 |
| B4 | −3.8635 × E − 0 |
| B6 | +1.5428 × E − 0 |
| B8 | −3.1025 × E − 1 |
| B10 | +2.1616 × E − 2 |

The 3rd surface
Aspheric surface coefficient

| | | |
|---|---|---|
| κ | −1.90222 × E − 0 | |
| A1 | +2.23498 × E − 2 | P1 4.0 |
| A2 | −1.11325 × E − 2 | P2 6.0 |
| A3 | +5.18333 × E − 3 | P3 8.0 |
| A4 | −1.48863 × E − 3 | P4 10.0 |
| A5 | +2.17667 × E − 4 | P5 12.0 |
| A6 | −1.25321 × E − 5 | P6 14.0 |

Further, under the conditions that the objective lens has the finite magnification, and is made of plastic materials, the required numerical aperture of the optical information recording medium is 0.60, and temperatures are changed (including the shift of the oscillated wavelength of the laser light source), an amount of change of the spherical aberration is 0.039 $\lambda_1$ rms, which is excellent.

EXAMPLE 3

The present example relates to the third example mentioned above, and relates to the objective lens which has the interchangeability between DVD as the first optical information recording medium having a high recording density, and CD as the second information recording medium having a low recording density.

In the case of DVD, the transparent base board thickness of the optical information recording medium is 0.6 mm, the required numerical aperture NA1 is 0.60, and the light source wavelength $\lambda_1$ is 655 nm. In the case of CD, the transparent base board thickness of the optical information recording medium is 1.2 mm, the required numerical aperture NA2 is 0.45, and the light source wavelength $\lambda_2$ is 785 nm.

Figure 2:
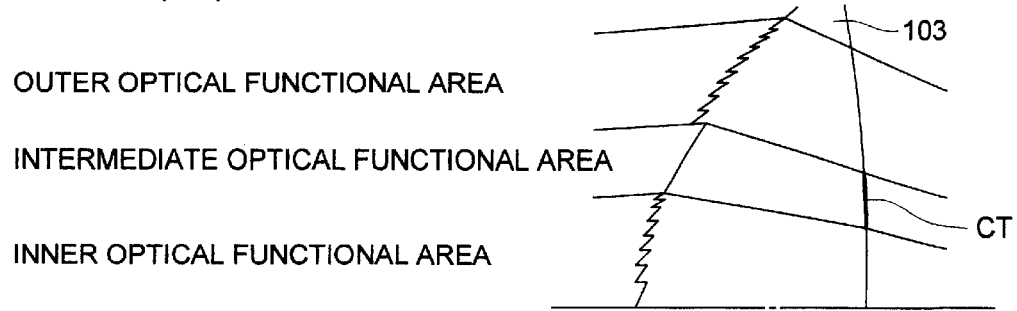
FIG. 2 is sectional views of the objective lens to explain the optical surface area.
Figure 2:
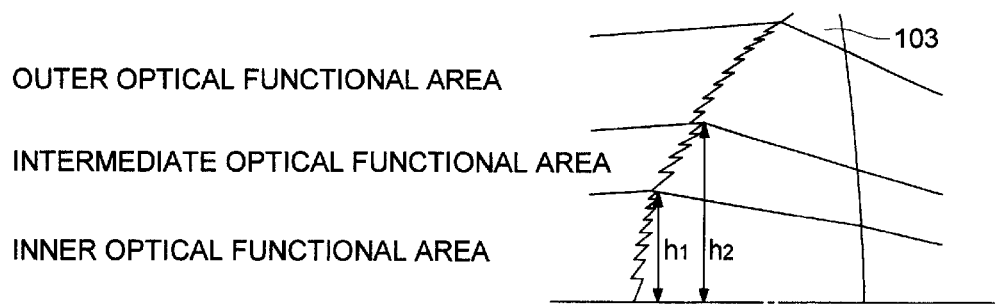
Figure 2:
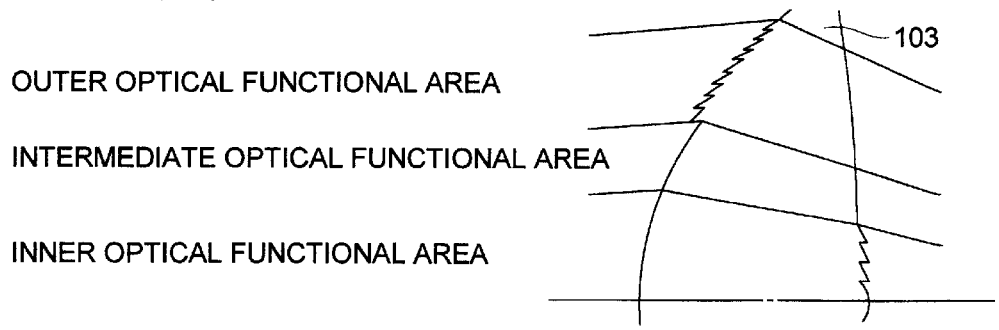
Figure 2:
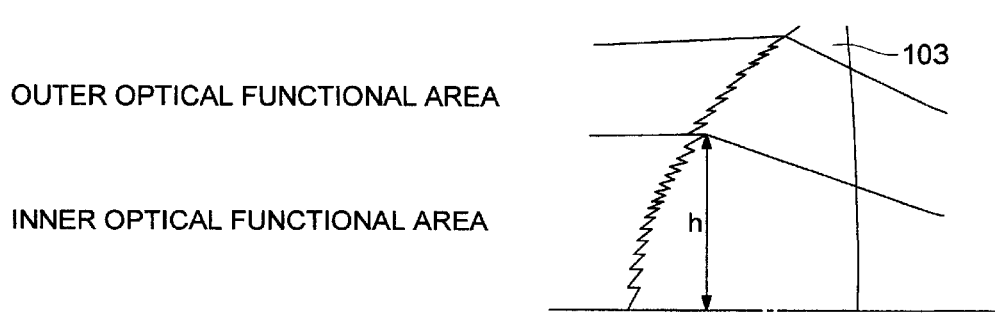
Figure 3:
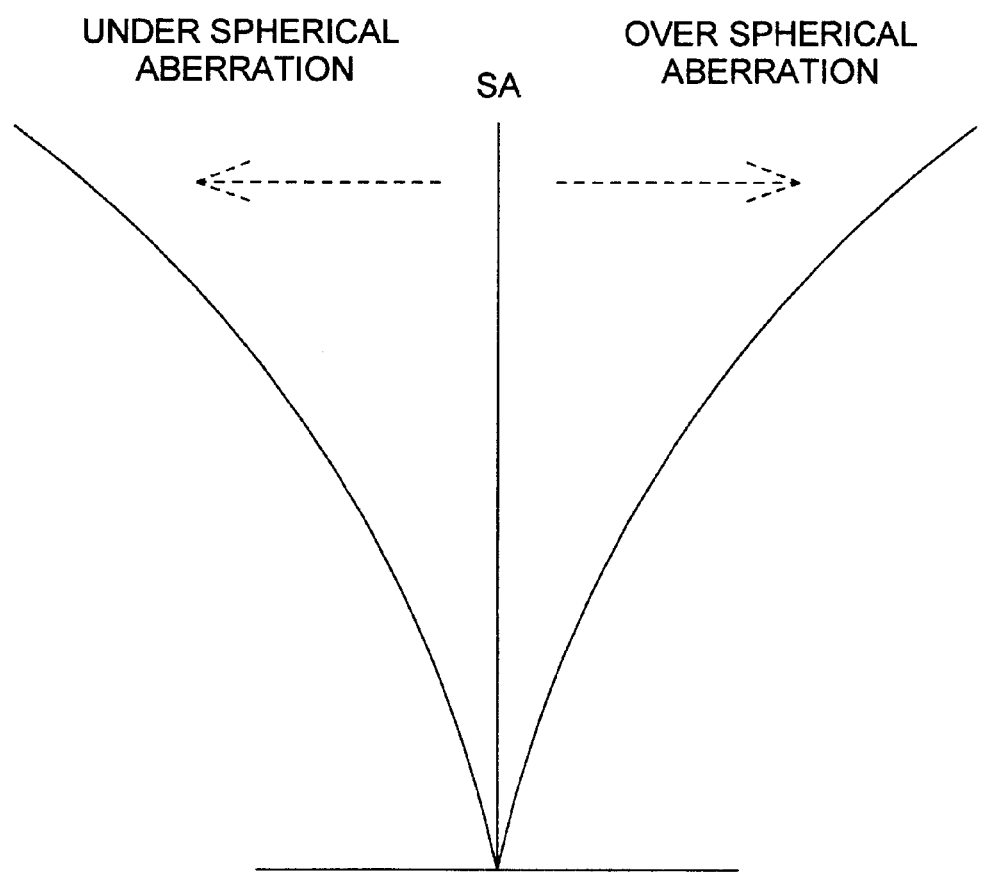
FIG. 3 is a drawing showing whether the aberration is under or over.

The objective lens is aspherical on both surfaces. The surface facing the light source is composed of three optical functional areas, which are used for the different purposes. As shown in FIG. 2(b), on the inner optical functional area being inside the distance h1 from the optical axis, and on the outer optical functional area outside the distance h2, both of which are the aspheric surfaces, the diffractive structures are formed together. Incidentally, the intermediate optical functional area located between them has also the diffractive structure.

Here, in the diffractive structure of the inner optical functional area of h1, the spherical aberration is corrected concerning the light flux passing through the area, when the DVD and CD are used. Since both of DVD and CD use the inner optical functional area, to use the same diffraction order number is preferable from the view point of the light using efficiency, accordingly, the present example used the first-order diffracted light concerning the diffraction order number.

Concerning the light flux passing through the outer optical functional area outside the distance h2, the light flux for CD is flared, and the spherical aberration is corrected for the light flux for DVD, in the same way as the above-mentioned example. The diffracted light used for DVD and CD was the first-order diffracted light, and the designing wavelength was established to be equal to the wavelength for DVD.

The situation, that the diffractive structure of the intermediate optical functional area corrects the spherical aberration when DVD is used and flares the light flux when CD is used, is same as the case of the diffractive structure of the outer optical functional area, and additionally, the design has the flared amount (amount away from the main spot in this case) to be larger. The lens data of the objective lens of the present example are shown in Table 4, and the drawings of the spherical aberrations are shown in FIG. 11.

TABLE 4

Example 3 lens data $F_1 = 3.40$ mm $\quad m_1 = -1/7.2$

| $i_{th}$ surface | ri | di (655 nm) | ni (655 nm) | di (785 nm) | ni (785 nm) | |
|---|---|---|---|---|---|---|
| 0 | | 27.1651 | | 27.5295 | | |
| 1 | ∞ | 0.0 | 1.0 | 0.0 | 1.0 | Diameter of an aperture of diaphragm 4.5436 mm |
| 2 | 2.34223 | 2.9 | 1.54094 | 2.9 | 1.53716 | |
| 2' | 2.45039 | 2.8929 | 1.54094 | 2.8929 | 1.53716 | |
| 2" | 2.49115 | 2.8976 | 1.54094 | 2.8976 | 1.53716 | |
| 3 | −4.8416 | 2.01378 | 1.0 | 1.64941 | 1.0 | |
| 4 | ∞ | 0.6 | 1.57752 | 1.2 | 1.57063 | |
| 5 | ∞ | | | | | |

Data of aspheric surface

The 2nd surface (0 < h < 1.757 mm: DVD/CD common area)
Aspheric surface coefficient

| κ | +1.9842 × E − 0 | |
|---|---|---|
| A1 | −7.8168 × E − 3 | P1 4.0 |
| A2 | −2.6336 × E − 3 | P2 6.0 |
| A3 | +6.5161 × E − 4 | P3 8.0 |
| A4 | −4.6809 × E − 4 | P4 10.0 |
| A5 | +1.3052 × E − 4 | P5 12.0 |
| A6 | −1.7981 × E − 5 | P6 14.0 |

Optical path difference function (coefficient of optical path difference function: standard wavelength 720 nm)

| B4 | −6.8480 × E − 1 |
| B6 | −3.4672 × E − 1 |
| B8 | +9.4038 × E − 2 |
| B10 | −1.0037 × E − 2 |

The 2'nd surface (1.757 mm < h < 1.952 mm: DVD exclusive area)
Aspheric surface coefficient

| κ | −7.5473 × E − 1 | |
|---|---|---|
| A1 | +1.3248 × E − 2 | P1 4.0 |
| A2 | −7.5434 × E − 3 | P2 6.0 |
| A3 | +1.9491 × E − 3 | P3 8.0 |
| A4 | −2.6331 × E − 4 | P4 10.0 |
| A5 | +1.8217 × E − 5 | P5 12.0 |
| A6 | −5.1106 × E − 7 | P6 14.0 |

Optical path difference function (coefficient of optical path difference function: standard wavelength 655 nm)

| B2 | +8.3505 × E − 0 |
| B4 | −6.7131 × E − 0 |
| B6 | +1.4679 × E − 0 |
| B8 | −2.2767 × E − 1 |
| B10 | +1.6721 × E − 2 |

The 2"nd surface (1.952 mm < h: DVD exclusive area)
Aspheric surface coefficient

| κ | −6.7190 × E − 1 | |
|---|---|---|
| A1 | +1.4186 × E − 2 | P1 4.0 |
| A2 | −7.4834 × E − 3 | P2 6.0 |
| A3 | +1.9399 × E − 3 | P3 8.0 |
| A4 | −2.6720 × E − 4 | P4 10.0 |
| A5 | +1.7809 × E − 5 | P5 12.0 |

-continued

Data of aspheric surface

| A6 | −4.5775 × E − 7 | P6 14.0 |

Optical path difference function (coefficient of optical path difference function: standard wavelength 655 nm)

| B2 | +1.9429 × E − 0 |
| B4 | −4.1994 × E − 0 |
| B6 | +1.4300 × E − 0 |
| B8 | −2.6371 × E − 1 |
| B10 | +1.7489 × E − 2 |

The 3rd surface
Aspheric surface coefficient

| κ | −1.63569 × E + 1 | |
|---|---|---|
| A1 | +1.02626 × E − 2 | P1 4.0 |
| A2 | −9.93228 × E − 3 | P2 6.0 |
| A3 | +5.40235 × E − 3 | P3 8.0 |
| A4 | −1.52935 × E − 3 | P4 10.0 |
| A5 | +2.13329 × E − 4 | P5 12.0 |
| A6 | −1.17997 × E − 5 | P6 14.0 |

Figure 13:
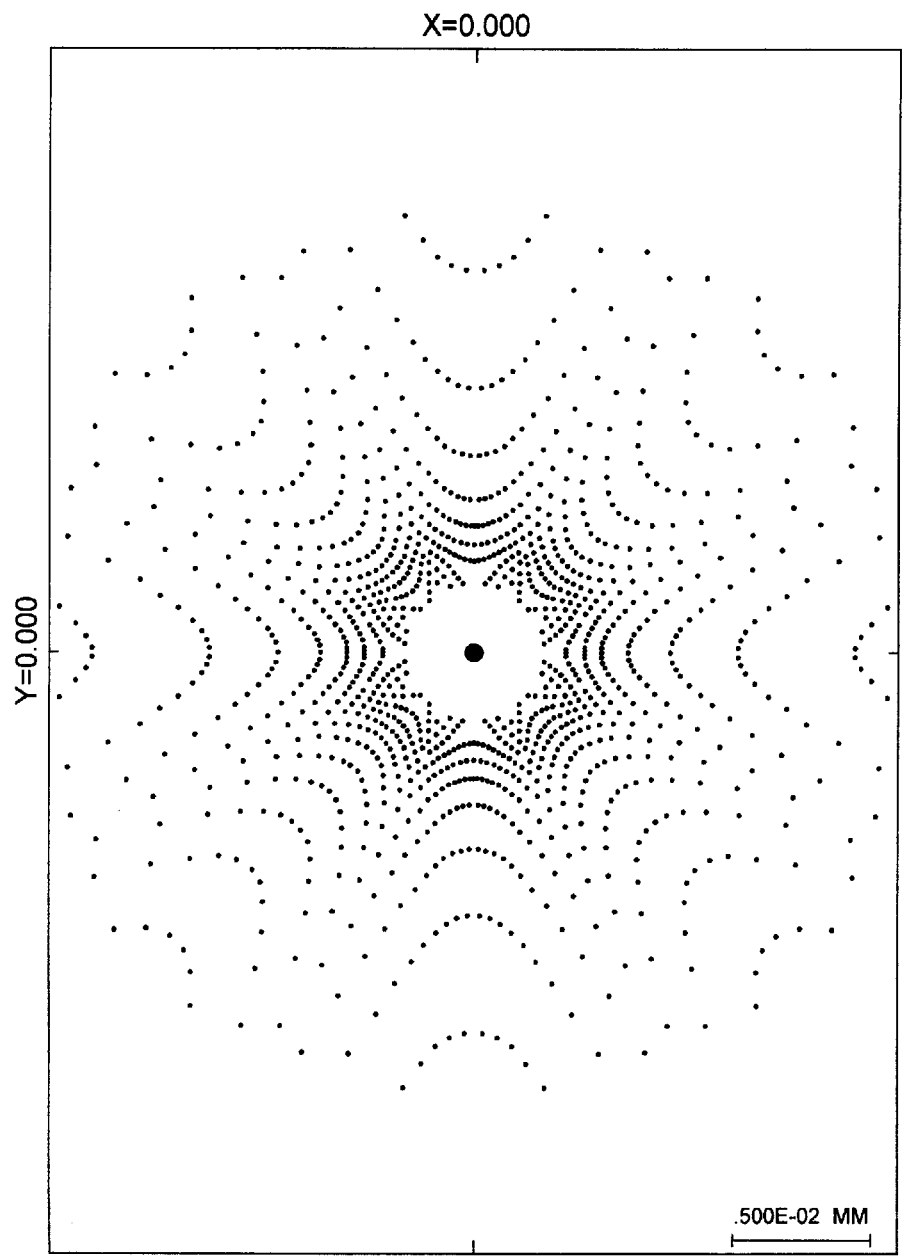
FIG. 13 is a drawing showing the spot profile on the optical information recording surface, when CD is on the best defocus corresponding to FIG. 12(b).
Figure 14:
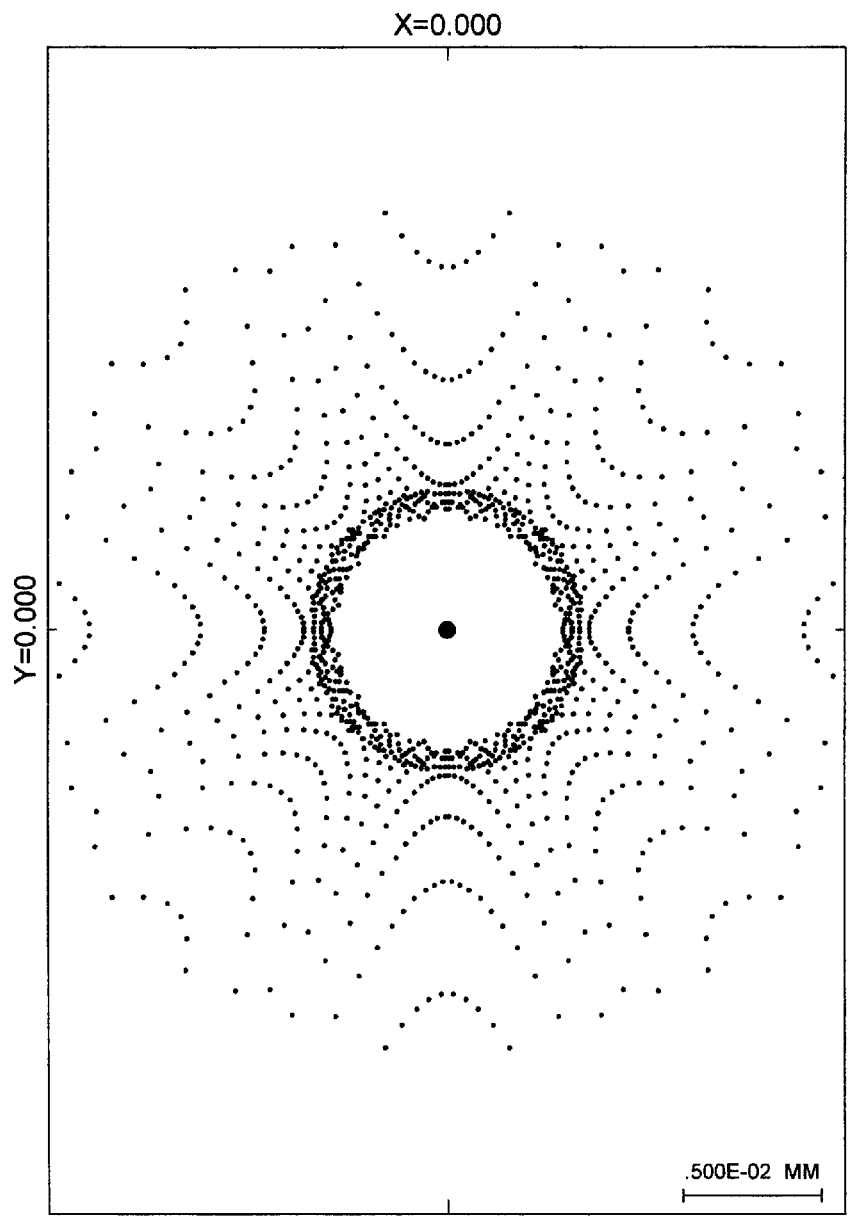
FIG. 14 is a drawing showing the spot profile on the optical information recording surface, when CD is on the best defocus corresponding to FIG. 12(a).

FIG. 12 shows the simulation result of the objective lens defocusing signal in the present example, that is, graph (a) is the case that the intermediate optical functional area is structured with the different diffraction surface of the outer optical functional area, and graph (b) is the case that the intermediate optical functional area is structured with the same diffraction surface of the outer optical functional area. Further, FIG. 13 shows the spot profile on the optical information recording surface, when CD is on the best defocus corresponding to of FIG. 12(b). FIG. 14 shows the spot profile on the optical information recording surface, when CD is on the best defocus corresponding to FIG. 12(a). As cleared by the comparison of these figures, the greater the distance between the main spot and the flare is, the less the light amount incident on the optical detector among flared light is, due to this, it is possible to reduce the noise signal generated during the defocusing of the objective lens in the case of using CD.

Further, under the conditions that the objective lens has the finite magnification, and is made of plastic, the required numerical aperture of the optical information recording medium is 0.60, and temperatures are changed (including the shift of oscillated wavelength of the laser light source), an amount of change of the spherical aberration is 0.041 $\lambda_1$ rms, which is excellent.

EXAMPLE 4

The present example relates to the fourth embodiment mentioned above, and in particular, to the objective lens which has the interchangeability between DVD as the first optical information recording medium having a high recording density, and CD as the second information recording medium having a low recording density.

Figure 15:
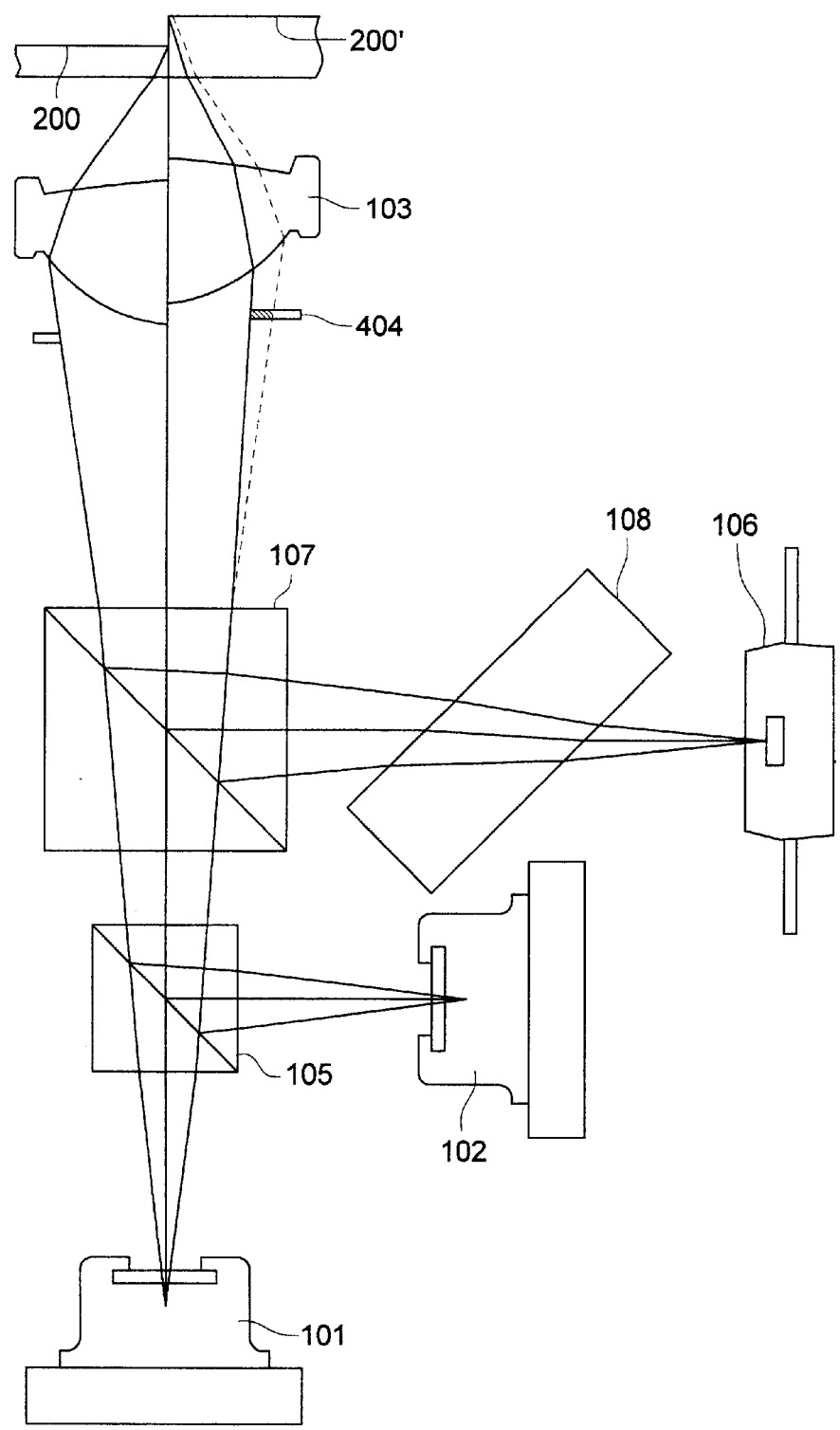
FIG. 15 is a schematic structural drawing of the optical pickup device of the present embodiment.
Figure 16:
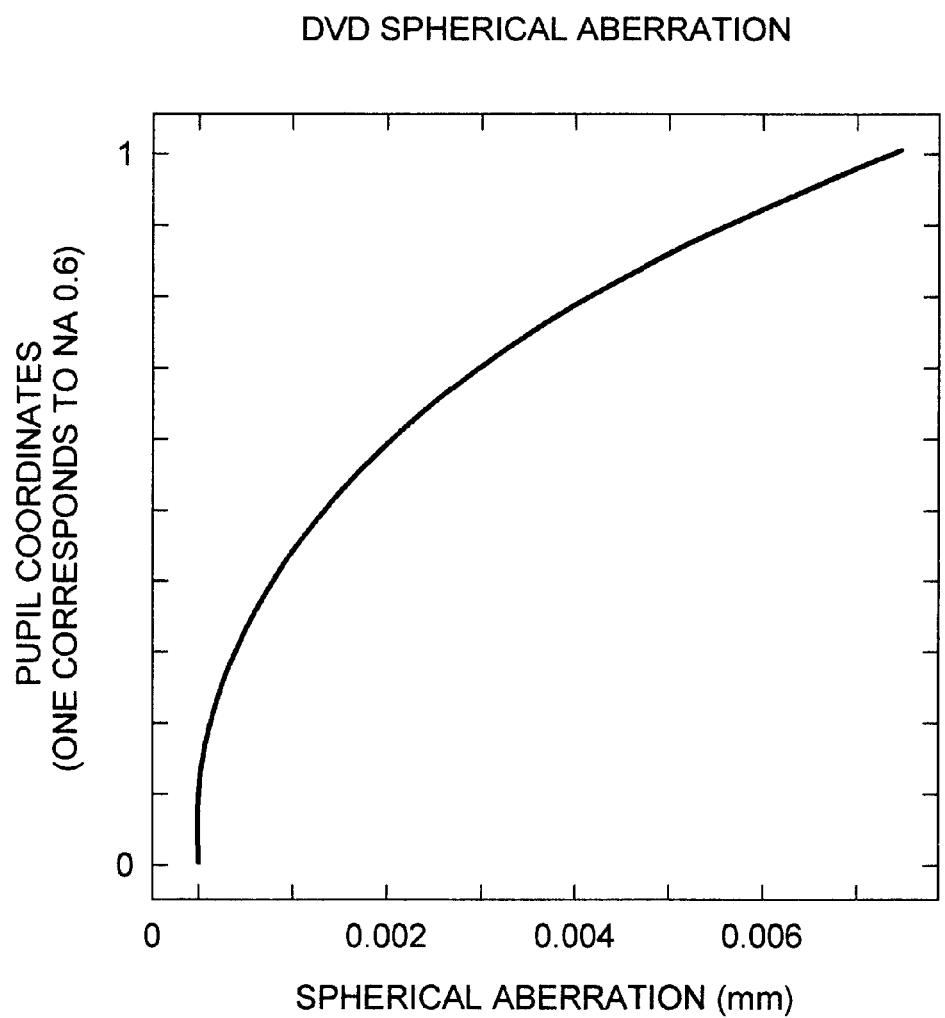
FIG. 16 is a drawing showing the characteristic of the spherical aberration when DVD is used.

The objective lens is aspherical on both surfaces, and the diffractive structure is unitized solidly on the surface facing the light source. FIG. 15 shows a schematic structural drawing of the optical pickup device of the present example. As compared with the optical pickup device shown in FIG. 4, there is only one different point, which means that liquid crystal shutter 404 representing a variable aperture diaphragm is used instead of diaphragm 104. That is, the liquid crystal shutter 404 representing the light amount reducing means controls the light flux diameter incident on objective lens 103, by increasing the aperture diameter when DVD is used, and by decreasing the aperture diameter when CD is used, and due to this, it is possible to reduce the light amount of the flare incident on optical sensor 106, when CD is used. Incidentally, it is conceivable to use a dichroic filter, instead of the liquid crystal shutter 104.

Further, setting the transmittance of the light flux passing through the inner optical functional area to be not less than 90%, and forming the coated subject on the objective lens 103 which makes the transmittance of the light flux of the light source wavelength when CD is used to be 50%, it is possible to reduce the light amount of the flared light incident on the optical sensor 106, when CD is used.

On the objective lens whose temperature characteristic is strict in the specification, by keeping the temperature characteristic better, and forming the various optical functional areas on the objective lens, it is possible to provide the objective lens for the optical pickup device which can perform the recording/reproduction for the various kinds of the optical information recording media, the optical pickup device, and the information recording and reproducing means.

What is claimed is:

1. An objective lens for use in an optical pickup apparatus which comprises a first light source to emit a first light flux having a wavelength $\lambda 1$ for recording or reproducing information of a first optical information recording medium including a transparent substrate having a thickness t1, a second light source to emit a second light flux having a wavelength $\lambda 2$ for recording or reproducing information of a second optical information recording medium including a transparent substrate having a thickness t2 (t1<t2), a converging optical system having the objective lens to converge the first or second light flux through the transparent substrate onto an information recording plane of the first or second information recording medium, and a photo detector, the objective lens having a magnification m satisfying the following formula:

$-0.33 < m < -0.10$ the objective lens comprising at least two optically functional regions arranged in a direction perpendicular to an optical axis and each of the two optically functional regions having a diffractive structure;

wherein the diffractive structure of an inner optically functional region arranged closer to the optical axis among the two optically functional regions corrects aspherical aberration of the first or second light flux when the first or second light flux passes through the inner optically functional region for recording or reproducing information of the first or second information recording medium;

wherein the diffractive structure of an outer optically functional region arranged far from the optical axis among the two optically functional regions corrects aspherical aberration of the first light flux when the first light flux passes through the outer optically functional region for recording or reproducing information of the first information recording medium;

wherein the diffractive structure of the outer optically functional region makes the second light flux flared when the second light flux passes through the outer optically functional region; and the objective lens comprising a light amount reducing structure to reduce an amount of the second light flux passing through a region of the objective lens other than the inner optically functional region.

2. The objective lens of claim 1, wherein the light amount reducing structure is provided to the outer optically functional region such that the transmissivity of the second light flux when the second light flux passes through the outer optically functional region is smaller than that of the first light flux when the first light flux passes through the outer optically functional region.

3. The objective lens of claim 1, wherein the objective lens further comprises an intermediate optically functional region provided between the inner optically functional region and the outer optically functional region and the light amount reducing structure is provided to the intermediate optically functional region so as to reduce the light amount of the second light flux when the second light flux passes through the intermediate optically functional region.

4. The objective lens of claim 3, wherein the light amount reducing structure is one of a refractive surface and a diffractive structure provided to the intermediate optically functional region and the intermediate optically functional region makes the second light flux flare when the second light flux passes through the intermediate optically functional region for recording or reproducing information of the second information recording medium.

5. The objective lens of claim 3, wherein the light amount reducing structure is a diffractive structure provided to the intermediate optically functional region and a spherical aberration of the second light flux is made under when the second light flux passes through the intermediate optically functional region for recording or reproducing information of the second information recording medium.

6. The objective lens of claim 3, wherein the light amount reducing structure corrects a spherical aberration of the first light flux when the first light flux passes through the intermediate optically functional region for recording or reproducing information of the first information recording medium.

7. The objective lens of claim 3, wherein the light amount reducing structure is a dichroic filter provided to the intermediate optically functional region.

8. The objective lens of claim 3, wherein the light amount reducing structure is a liquid crystal shutter.

9. The objective lens of claim 1, wherein the following formula is satisfied when the recording or reproducing information conducted for the second optical information medium, $$|n_{out}| \geq |n_{in}|$$

where $n_{out}$ is a diffraction order number of a diffracted light ray having the strongest intensity among diffracted light rays generated at the diffractive structure of the outer optically functional region and $n_{in}$ is a diffraction order number of a diffracted light ray having the strongest intensity among diffracted light rays generated at the diffractive structure of the inner optically functional region.

10. The objective lens of claim 1, wherein the following formula is satisfied:

$$0.5\lambda1 < \lambda_B < 1.1\lambda1$$

where $\lambda_B$ is a standard design wavelength for the diffractive structure of the outer optically functional region.

11. The objective lens of claim 1, wherein the light amount reducing structure is provided to the outer optically functional region such that the transmissivity of the second light flux when the second light flux passes through the outer optically functional region is 50% or less.

12. The objective lens of claim 11, wherein the transmissivity of the first or second light flux when the first or second light flux passes through the inner optically functional region is 90% or more.

13. The objective lens of claim 1, wherein the following formulas are satisfied:

$$-1/2.5 \geq m1 \geq -1/10$$

$$0.65 \geq NA1 \geq 0.55$$

wherein m1 is a magnification of the objective lens when recording or reproducing information is conducted for the first optical information recording medium, and NA1 is a necessary numerical aperture of the objective lens for the first information recording medium at the optical information recording medium side.

14. The objective lens of claim 1, wherein the following formulas are satisfied:

$$-1/2.5 \geq m2 \geq -1/10$$

$$0.57 \geq NA2 \geq 0.43$$

wherein m2 is a magnification of the objective lens when recording or reproducing information is conducted for the second optical information recording medium, and NA2 is a necessary numerical aperture of the objective lens for the second information recording medium at the optical information recording medium side.

15. The objective lens of claim 1, wherein the objective lens is made of a plastic material.

16. An optical pickup apparatus, comprising:
a first light source to emit a first light flux having a wavelength λ1 for recording or reproducing information of a first optical information recording medium including a transparent substrate having a thickness t1;
a second light source to emit a second light flux having a wavelength λ2 for recording or reproducing information of a second optical information recording medium including a transparent substrate having a thickness t2 (t1<t2);
a converging optical system having an objective lens to converge the first or second light flux through the transparent substrate onto an information recording plane of the first or second information recording medium, and a photo detector;
the objective lens having a magnification m satisfying the following formula:

$$-0.33 < m < -0.10$$

the objective lens comprising at least two optically functional regions arranged in a direction perpendicular to an optical axis and each of the two optically functional regions having a diffractive structure;
wherein the diffractive structure of an inner optically functional region arranged closer to the optical axis among the two optically functional regions corrects aspherical aberration of the first or second light flux when the first or second light flux passes through the inner optically functional region for recording or reproducing information of the first or second information recording medium;
wherein the diffractive structure of an outer optically functional region arranged far from the optical axis among the two optically functional regions corrects aspherical aberration of the first light flux when the first light flux passes through the outer optically functional region for recording or reproducing information of the first information recording medium;
wherein the diffractive structure of the outer optically functional region makes the second light flux flared when the second light flux passes through the outer optically functional region; and
the objective lens comprising a light amount reducing structure to reduce an amount of the second light flux passing through a region of the objective lens other than the inner optically functional region.

17. The optical pickup apparatus of claim 16, wherein the light amount reducing structure is provided to the outer optically functional region such that the transmissivity of the second light flux when the second light flux passes through the outer optically functional region is smaller than that of the first light flux when the first light flux passes through the outer optically functional region.

18. The optical pickup apparatus of claim 16, wherein the objective lens further comprises an intermediate optically functional region provided between the inner optically functional region and the outer optically functional region and the light amount reducing structure is provided to the intermediate optically functional region so as to reduce the light amount of the second light flux when the second light flux passes through the intermediate optically functional region.

19. The optical pickup apparatus of claim 18, wherein the light amount reducing structure is one of a refractive surface and a diffractive structure provided to the intermediate optically functional region and the intermediate optically functional region makes the second light flux flare when the second light flux passes through the intermediate optically functional region for recording or reproducing information of the second information recording medium.

20. The optical pickup apparatus of claim 18, wherein the light amount reducing structure is a diffractive structure provided to the intermediate optically functional region and a spherical aberration of the second light flux is made under when the second light flux passes through the intermediate optically functional region for recording or reproducing information of the second information recording medium.

21. The optical pickup apparatus of claim 18, wherein the light amount reducing structure corrects a spherical aberration of the first light flux when the first light flux passes through the intermediate optically functional region for recording or reproducing information of the first information recording medium.

22. The optical pickup apparatus of claim 18, wherein the light amount reducing structure is a dichroic filter provided to the intermediate optically functional region.

23. The optical pickup apparatus of claim 16, wherein the light amount reducing structure is a liquid crystal shutter.

24. The optical pickup apparatus of claim 16, wherein the following formula is satisfied when the recording or reproducing information conducted for the second optical information medium, $$|n_{out}| \geq |n_{in}|$$

where $n_{out}$ is a diffraction order number of a diffracted light ray having the strongest intensity among diffracted light rays generated at the diffractive structure of the outer optically functional region and $n_{in}$ is a diffraction order number of a diffracted light ray having the strongest intensity among diffracted light rays generated at the diffractive structure of the inner optically functional region.

25. The optical pickup apparatus of claim 16, wherein the following formula is satisfied:

$$0.5\lambda 1 < \lambda_B < 1.1\lambda 1$$

where $\lambda_B$ is a standard design wavelength for the diffractive structure of the outer optically functional region.

26. The optical pickup apparatus of claim 16, wherein the light amount reducing structure is provided to the outer optically functional region such that the transmissivity of the second light flux when the second light flux passes through the outer optically functional region is 50% or less.

27. The optical pickup apparatus of claim 26, wherein the transmissivity of the first or second light flux when the first or second light flux passes through the inner optically functional region is 90% or more.

28. The optical pickup apparatus of claim 16, wherein the following formulas are satisfied:

$$-1/2.5 \geq m1 \geq -1/10$$

$$0.65 \geq NA1 \geq 0.55$$

wherein m1 is a magnification of the objective lens when recording or reproducing information is conducted for the first optical information recording medium, and NA1 is a necessary numerical aperture of the objective lens for the first information recording medium at the optical information recording medium side.

29. The optical pickup apparatus of claim 16, wherein the following formulas are satisfied:

$$-1/2.5 \geq m2 \geq -1/10$$

$$0.57 \geq NA2 \geq 0.43$$

wherein m2 is a magnification of the objective lens when recording or reproducing information is conducted for the second optical information recording medium, and NA2 is a necessary numerical aperture of the objective lens for the second information recording medium at the optical information recording medium side.

30. The optical pickup apparatus of claim 16, wherein the objective lens is made of a plastic material.

31. The optical pickup apparatus of claim 16, wherein the light amount reducing structure is a diaphragm having an aperture which allows the first light flux to pass through the outer optically functional region with a first transmissivity when recording or reproducing information is conducted for the first optical information recording medium and allows the second light flux to pass through the outer optically functional region with a second transmissivity lower than the first transmissivity when recording or reproducing information is conducted for the second optical information recording medium.

32. An apparatus for recording or reproducing information of a first optical information recording medium including a transparent substrate having a thickness t1 or a second optical information recording medium including a transparent substrate having a thickness t2 (t1<t2), comprising:

a first light source to emit a first light flux having a wavelength $\lambda 1$ for recording or reproducing information of the first optical information recording medium;

a second light source to emit a second light flux having a wavelength $\lambda 2$ for recording or reproducing information of the second optical information recording medium;

a converging optical system having an objective lens to converge the first or second light flux through the transparent substrate onto an information recording plane of the first or second information recording medium, and a photo detector;

the objective lens having a magnification m satisfying the following formula:

$$-0.33 < m < -0.10$$

the objective lens comprising at least two optically functional regions arranged in a direction perpendicular to an optical axis and each of the two optically functional regions having a diffractive structure;

wherein the diffractive structure of an inner optically functional region arranged closer to the optical axis among the two optically functional regions corrects aspherical aberration of the first or second light flux when the first or second light flux passes through the inner optically functional region for recording or reproducing information of the first or second information recording medium;

wherein the diffractive structure of an outer optically functional region arranged far from the optical axis among the two optically functional regions corrects aspherical aberration of the first light flux when the first light flux passes through the outer optically functional region for recording or reproducing information of the first information recording medium;

wherein the diffractive structure of the outer optically functional region makes the second light flux flared when the second light flux passes through the outer optically functional region; and the objective lens comprising a light amount reducing structure to reduce an amount of the second light flux passing through a region of the objective lens other than the inner optically functional region.

* * * * *